US008202824B2

(12) United States Patent
Reddy et al.

(10) Patent No.: US 8,202,824 B2
(45) Date of Patent: *Jun. 19, 2012

(54) VARIABLE DENSITY TREATMENT FLUIDS

(75) Inventors: B. Raghava Reddy, Duncan, OK (US);
Krishna Ravi, Kingwood, TX (US);
Michael Szymanski, Duncan, OK (US);
Dale Jamison, Humble, TX (US);
Donald Whitfill, Kingwood, TX (US)

(73) Assignee: Halliburton Energy Services Inc., Duncan, OK (US)

( * ) Notice: Subject to any disclaimer, the term of this patent is extended or adjusted under 35 U.S.C. 154(b) by 440 days.

This patent is subject to a terminal disclaimer.

(21) Appl. No.: 12/342,856

(22) Filed: Dec. 23, 2008

(65) Prior Publication Data

US 2009/0163388 A1    Jun. 25, 2009

Related U.S. Application Data

(60) Continuation-in-part of application No. 11/489,641, filed on Jul. 18, 2006, now abandoned, which is a division of application No. 10/765,510, filed on Jan. 27, 2004, now Pat. No. 7,108,066, application No. 12/342,856, which is a continuation-in-part of application No. 12/165,760, filed on Jul. 1, 2008, now Pat. No. 7,749,942, which is a continuation-in-part of application No. 10/721,055, filed on Nov. 24, 2003, now Pat. No. 7,482,309, and a continuation-in-part of application No. 10/350,533, filed on Jan. 24, 2003, now Pat. No. 7,543,642.

(51) Int. Cl.
*C09K 8/60* (2006.01)

(52) U.S. Cl. .............................. 507/233; 428/402; 264/5
(58) Field of Classification Search ................. 428/402; 264/5; 507/233
See application file for complete search history.

(56) References Cited

U.S. PATENT DOCUMENTS

| 3,399,727 | A | * | 9/1968 | Graham et al. | ............. 166/280.1 |
| 4,303,731 | A | * | 12/1981 | Torobin | ........................ 428/333 |
| 4,488,599 | A | * | 12/1984 | Graham et al. | ............... 166/281 |
| 4,536,361 | A | * | 8/1985 | Torobin | ........................ 264/167 |
| 4,582,534 | A | * | 4/1986 | Torobin | ......................... 75/229 |
| 5,103,913 | A | * | 4/1992 | Nimerick et al. | ........... 166/308.2 |
| 5,397,759 | A | * | 3/1995 | Torobin | ........................ 502/415 |
| 7,108,066 | B2 | * | 9/2006 | Jamison | ..................... 166/305.1 |
| 7,482,309 | B2 | * | 1/2009 | Ravi et al. | ..................... 507/125 |
| 7,749,942 | B2 | * | 7/2010 | Ravi et al. | ..................... 507/117 |

FOREIGN PATENT DOCUMENTS

WO    WO 0194744 A1 * 12/2001

OTHER PUBLICATIONS

Office Action for U.S. Appl. No. 90/010,296 dated Dec. 8, 2009.
Office Action for U.S. Appl. No. 12/165,760 dated Mar. 1, 2010.

* cited by examiner

*Primary Examiner* — Alicia Toscano
(74) *Attorney, Agent, or Firm* — Craig W. Roddy; McDermott, Will, .Emergy LLP

(57) ABSTRACT

The present invention provides variable density fluid compositions and methods for using such compositions in a subterranean formation. One exemplary embodiment of the variable density fluid compositions of the present invention comprises a variable density fluid comprising: a base fluid, and a portion of variable pressure weighting material particles.

17 Claims, 9 Drawing Sheets

VARIABLE DENSITY TREATMENT FLUIDS

CROSS-REFERENCE TO RELATED APPLICATIONS

This application is a continuation-in-part of: U.S. patent application Ser. No. 11/489,641, filed Jul. 18, 2006, now abandoned entitled "Variable Density Treatment Fluids," which is a divisional application of U.S. patent application Ser. No. 10/765,510, filed on Jan. 27, 2004, entitled "Variable Density Treatment Fluids and Methods of Using Such Fluids in Subterranean Formations," now issued as U.S. Pat. No. 7,108,066; and U.S. patent application Ser. No. 12/165,760, filed on Jul. 1, 2008, now U.S. Pat. No. 7,749,942 entitled "Variable Density Fluids and Methods of Use in Subterranean Formations," which is a continuation-in-part of U.S. patent application Ser. No. 10/721,055, filed Nov. 24, 2003, now U.S. Pat. No. 7,482,309 entitled "Variable Density Fluids and Methods of Use in Subterranean Formations" and U.S. patent application Ser. No. 10/350,533, filed Jan. 24, 2003, now U.S. Pat. No. 7,543,642 entitled "Cement Compositions Containing Flexible, Compressible Beads and Methods of Cementing in Subterranean Formations," the entire disclosures of which are incorporated herein by reference.

BACKGROUND

The present invention relates to subterranean treatment fluids. In particular, in some embodiments, the present invention relates to variable density subterranean treatment fluid compositions and methods for using such compositions. The present invention also relates to cementing in subterranean formations penetrated by well bores. In particular, in some embodiments, the present invention relates to cement compositions comprising variable pressure weighting material particles, and processes for making the compositions. The present invention also relates to variable density subterranean treatment fluids comprising variable density weighting materials and methods for preparing and for using such variable density subterranean treatment fluids.

A treatment fluid may be used in a subterranean formation in a variety of ways. For example, a fluid may be used to drill a borehole in a subterranean formation, to stimulate a well bore in a subterranean formation, and to clean up a well bore in a subterranean formation, as well as for numerous other purposes. The process of drilling a well typically requires the use of a treatment fluid referred to as a "drilling fluid." During the drilling process, the drilling fluid passes down through the inside of the drill string, exits through the drill bit, and returns to the drill rig through the annulus between the drill string and well bore. The circulating drilling fluid, inter alia, lubricates the drill bit, carries drill cuttings to the surface, and balances the formation pressure exerted on the well bore. Additionally, a properly prepared drilling fluid enhances well drilling safety by preventing "kicks." A kick is an uncontrolled flow of formation fluid into the well bore from the subterranean formation typically resulting from drilling into a zone of higher-than-expected or unanticipated pressure. Kicks may be both dangerous and very costly to drillers. Thus, drilling operators inherently wish to avoid or minimize kicks, or at least detect kicks as early as possible.

Drilling offshore in deep waters requires specially blended drilling fluids which must be carefully formulated to allow for, inter alia, the narrow range of pressure separating the pore pressure from the fracture gradient of the formation. As used herein, the term "pore pressure" refers to the pressure exerted on the borehole by fluids within the formation, while the term "fracture gradient" refers to that pressure that will fracture the formation. Such fracturing of the formation could result in flow of drilling fluids out of the borehole into the formation (commonly referred to as "lost circulation"), or possibly an uncontrolled blowout of the formation fluids, and in some cases, fluids and particulates. Accordingly, the weight of the drilling fluid preferably should be sufficient to balance the pore pressure (and thus provide the necessary protection against kicks) without inadvertently fracturing the sediment and rock around the drill bit.

The formulation of a drilling fluid satisfying these limitations is often complicated because the riser connecting the borehole to the drilling rig must often be quite long, particularly when drilling in deep water applications. As used herein, the term "riser" refers to a length of piping connecting the borehole to the drill ship or drilling rig, through which the drilling fluid is returned to the surface. The length of the riser column could be long, and thus the pressure exerted due to friction and hydrostatic forces could be considerable, even when at relatively shallow depths within the subterranean formation and even when using low density drilling fluids. Further complicating the formulation of the drilling fluid, at subsequent depths the hydrostatic and friction forces may be insufficient to prevent fluid influx from the formation.

Efforts to overcome this difficulty in drilling deep water wells have met with limited success. One proposed solution involves the installation of multiple strings of casing within the borehole to guard against inadvertent fracturing of the formation during the drilling process. This strategy is problematic because the installation of additional casing usually correspondingly reduces the usable diameter of the borehole. Furthermore, the installation of additional strings of casing may add greatly to the expense and complication of completing the well. Another option requires placement of pumps on the ocean floor, wherein drilling fluid exiting the well bore is diverted from the drilling riser annulus into the pumps. Subsequently, the pumps return the drilling fluid to the drill ship through additional pipes. Accordingly, in this method, the pumps remove the weight of the returning drilling fluid from the well bore. However, this method may not achieve desirable results because of the great expense involved in procuring and installing the system of risers and pumps. Another proposed option has been to reduce the density of the drilling fluid as it exits the well bore by injecting hollow rigid spheres into the drilling fluid to reduce the density of the drilling fluid. However, this method is problematic, inter alia, because of the cost and mechanical difficulty of injecting these spheres at the sea floor, and then separating them from the drilling fluid at the surface. Furthermore, the incompressible nature of these rigid spheres tends to cause them to crush at the pressures typically encountered in deepwater drilling; accordingly, such rigid spheres are typically unable to reduce the density of the drilling fluid while it travels upward toward the surface.

Analogous problems exist in other subterranean operations. For example, a fracturing or acidizing operation may involve additional expense in removing the spent fracturing or acidizing fluid from the well bore after the operation is conducted, due in part to the fixed-density nature of such fluids, which may necessitate additional manpower or pumping equipment to remove such fluid in a timely fashion. Other problems may exist in well cementing operations.

Well cementing is a process used in penetrating subterranean zones (also known as subterranean formations) to recover subterranean resources such as gas, oil, minerals, and water. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement and water is placed in the annulus and permitted to set into a hard mass (i.e., sheath) to thereby attach the string of pipe to the walls of the well bore and seal the annulus.

Low density or lightweight cement compositions are commonly used in wells that extend through weak subterranean formations to reduce the hydrostatic pressure exerted by the cement column on the weak formation. Conventional lightweight cement compositions are made by adding more water to reduce the slurry density. Other materials such as bentonite, diatomaceous earth, and sodium metasilicate may be added to prevent the solids in the slurry from separating when the water is added. Unfortunately, this method has the drawback that the addition of more water increases the cure time and reduces the strength of the resulting cement.

Lightweight cement compositions containing hollow spheres have been developed as a better alternative to the cement compositions containing large quantities of water. The hollow spheres are typically cenospheres, glass hollow spheres, or ceramic hollow spheres. Cenospheres are hollow spheres primarily comprising silica ($SiO_2$) and alumina ($Al_2O_3$) and are filled with gas. Cenospheres are a naturally occurring by-product of the burning process of a coal-fired power plant. Their size may vary from about 10 to 350 μm. These hollow spheres reduce the density of the cement composition such that less water is required to form the cement composition. The curing time of the cement composition is therefore reduced. Further, the resulting cement has superior mechanical properties as compared to cement formed by adding more water. For example, the tensile and compressive strengths of the cement are greater.

During the life of the well, the cement sheath is subjected to detrimental cyclical stresses due to pressure and temperature changes resulting from operations such as pressure testing, drilling, fracturing, cementing, and remedial operations. Conventional hollow spheres suffer from the drawback of being brittle and fragile and thus often cannot sustain those cyclical stresses. As a result, the cement sheath develops cracks and thus fails to provide zonal isolation for the life of the well. A need therefore exists to develop a less brittle cement having properties that would enable it to withstand pressure and temperature fluctuations for the life of the well. Embodiments of the present invention advantageously provide cement compositions that can withstand the cyclical stresses that occur during the life of the well.

SUMMARY

The present invention relates to subterranean treatment fluids. In particular, in some embodiments, the present invention relates to variable density subterranean treatment fluid compositions and methods for using such compositions. The present invention also relates to cementing in subterranean formations penetrated by well bores. In particular, in some embodiments, the present invention relates to cement compositions comprising variable pressure weighting material particles, and processes for making the compositions. The present invention also relates to variable density subterranean treatment fluids comprising variable density weighting materials and methods for preparing and for using such variable density subterranean treatment fluids.

One embodiment of present invention is a variable density treatment fluid comprising a base fluid and a portion of variable pressure weighting material particles.

Another embodiment of the present invention is a variable pressure weighting material particle comprising a hollow, elastically deformable particle.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
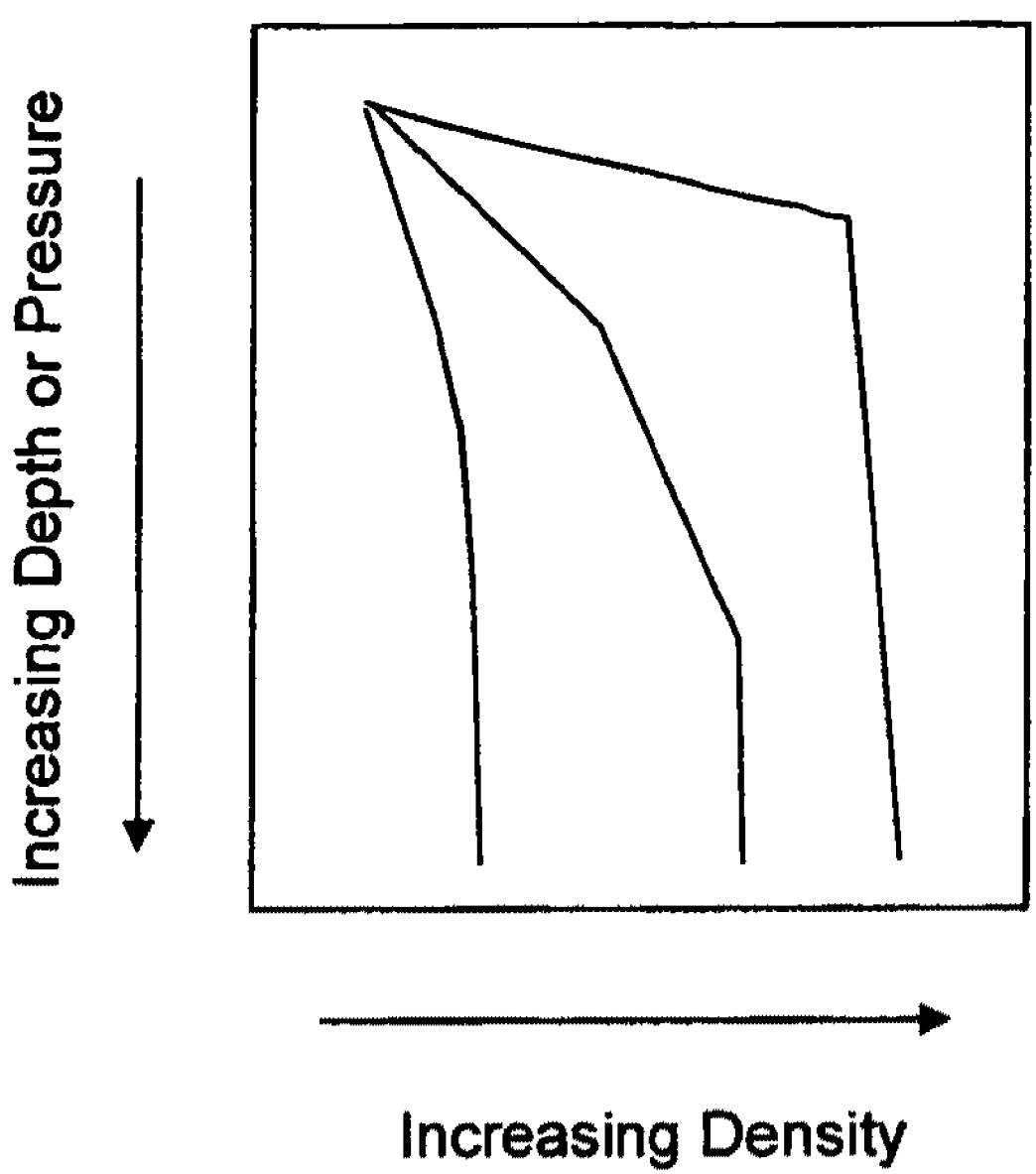
FIG. 1 is a graphical representation of exemplary pressure-density curves for certain embodiments of variable pressure weighting material particles.

The present invention relates to subterranean treatment fluids. In particular, in some embodiments, the present invention relates to variable density subterranean treatment fluid compositions and methods for using such compositions. The present invention also relates to cementing in subterranean formations penetrated by well bores. In particular, in some embodiments, the present invention relates to cement compositions comprising variable pressure weighting material particles, and processes for making the compositions. The present invention also relates to variable density subterranean treatment fluids comprising variable density weighting materials and methods for preparing and for using such variable density subterranean treatment fluids.

While the compositions and methods of some embodiments of the present invention are useful in a variety of subterranean applications, they may be particularly useful in deepwater offshore drilling operations. Although described in an offshore environment, the benefits of some embodiments of the present invention may also be appreciated in onshore wells, including, but not limited to, onshore wells that have small differences between pore pressure and fracture gradient.

The treatment fluids (e.g., variable density fluids) of the present invention may vary in density at particular phases of a subterranean operation (e.g., drilling, fracturing, or the like) as may be necessary to adapt to the subterranean conditions to which the fluid will be subjected. For example, where the treatment fluids of the present invention are utilized in offshore drilling applications, the treatment fluids may have a lower density when located above the ocean floor, and subsequently have a higher density when located within the well bore beneath the ocean floor. Generally, the treatment fluids of the present invention will have a density in the range of from about 4 lb/gallon to about 18 lb/gallon when measured at sea level. In some embodiments, when utilized in offshore applications, the treatment fluids will generally have a density in the range of from about 6 lb/gallon to about 20 lb/gallon, measured when at a point of maximum compression. In some embodiments, when utilized in offshore applications, the treatment fluids will generally have a density in the range of from about 8 lb/gallon to about 20 lb/gallon, measured when at a point of maximum compression.

In some embodiments, the treatment fluids of the present invention generally comprise a base fluid, and a portion of variable pressure weighting material particles. Other additives suitable for use in subterranean operations also may be added to these compositions if desired.

In some embodiments, the base fluid utilized in the treatment fluids of the present invention may be aqueous-based, non-aqueous-based, or mixtures thereof. Where the base fluid is aqueous-based, the water utilized can be fresh water, salt water (e.g., water containing one or more salts dissolved therein), brine (e.g., saturated salt water), or seawater. Generally, the water can be from any source provided that it does not contain an excess of compounds that may adversely affect other components in the variable density fluid. Where the base fluid is non-aqueous-based, the base fluid may comprise any number of organic fluids. Examples of suitable organic fluids include, but are not limited to, mineral oils, synthetic oils, esters and the like. Generally, these organic fluids may generically be referred to as "oils." In some embodiments where a treatment fluid of the present invention comprises these organic fluids, and is used in drilling operations, such treatment fluids may be referred to as "oil based fluids" or "oil based muds." Generally, any oil in which a water solution of salts can be emulsified may be suitable for use as a base fluid in the treatment fluids of the present invention. Generally, the base fluid may be present in an amount sufficient to form a pumpable treatment fluid. More particularly, in some embodiments, the base fluid is typically present in the treatment fluid in an amount in the range of from about 20% to about 99.99% by volume of the treatment fluid. One of ordinary skill in the art with the benefit of this disclosure will recognize the appropriate amount of base fluid to include within the treatment fluids of the present invention in order to provide pumpable treatment fluid.

In some embodiments, the treatment fluids of the present invention further comprise a portion of variable pressure weighting material particles. The variable pressure weighting material particles have the capability of varying in density with external pressure; as the variable pressure weighting material particles encounter higher downhole pressures, they compress, thereby reducing their volume and increasing their density, as illustrated in FIG. 1, which depicts exemplary pressure-density curves for certain embodiments of variable pressure weighting material particles. In certain embodiments, the variable pressure weighting material particles comprise elastic particles (also referred to as flexible, compressible beads). In certain embodiments, the elastic particles comprise hollow, elastically deformable particles. As referred to herein, the term "elastic" will be understood to mean the tendency for a particle to deform or compress under an applied force, and then re-expand as the force is removed, without substantial adverse effect to the structure of the particle. Any variable pressure weighting material particle having a specific gravity in the range of from about 0.05 to about 1.08 that is shear resistant, fatigue resistant and that is substantially impermeable to the fluids typically encountered in subterranean formations may be suitable for use with the treatment fluids of the present invention. In certain embodiments, the variable pressure weighting material particles may have a specific gravity in the range of about 0.1 to about 0.99 and alternatively, about 0.1 to about 0.5. Further, the variable pressure weighting material particles will also have an isothermal compressibility factor. As referred to herein, the term "isothermal compressibility factor" will be understood to mean a particle's change in volume with pressure, per unit volume of the particle, while temperature is held constant. Any variable pressure weighting material particle having an isothermal compressibility factor in the range of from about $1.5 \times 10^{-3}$ (1/psi) to about $1.5 \times 10^{-9}$ (1/psi) may be suitable for use with some embodiments of the present invention. Further, to achieve certain beneficial effects of the present invention in some embodiments where the treatment fluids are used in drilling operations, the variable pressure weighting material particles should be able to withstand the rigors of being pumped and/or circulated through a drill bit, e.g., they should be of a size small enough to be pumped and/or circulated through the drill bit and other drilling equipment including the shale shaker, and they should be resistant to the temperatures and pressures that they will encounter during drilling operations. In certain exemplary embodiments where the treatment fluids are used in drilling operations, the variable pressure weighting material particles resist adhering to the drill pipe, the drill bit or the subterranean formation. In certain exemplary embodiments, a portion of the variable pressure weighting material particles may be able to withstand temperatures of up to about 650° F. without degrading, alternatively up to about 500° F. In certain exemplary embodiments, a portion of the variable pressure weighting material particles can withstand pressures of up to about 21,000 psi without crushing, and return to about their original dimensions when pressure is removed.

In certain exemplary embodiments, the variable pressure weighting material particles may comprise an internal fluid. In certain embodiments, the internal fluid may be compressible. Where the variable pressure weighting material particles comprise an internal fluid, the internal fluid may become incorporated within the variable pressure weighting material particles (so that the variable pressure weighting material particle forms a boundary around the internal fluid) by any means. For example, the internal fluid may be injected into the variable pressure weighting material particle. As another example, the internal fluid may become incorporated within the variable pressure weighting material particle as a consequence of the process of manufacturing the variable pressure weighting material particles. One of ordinary skill in the art with the benefit of this disclosure will recognize an appropriate means by which the internal fluid may become incorporated within the variable pressure weighting material particle. The internal fluid within the variable pressure weighting material particle may comprise air, ammonia, argon, nitrogen, carbon dioxide, propane, butane, fluorinated hydrocarbons, fluorinated hydrocarbon refrigerants, hydrochlorofluorocarbons, nitrogen, mixtures thereof, or the like. The preceding list is not intended to be an exhaustive list, but rather is intended merely to provide an illustration of some types of internal fluids which may be suitable for use in accordance with embodiments of the present invention. Other fluids may also be suitable, and one of ordinary skill in the art with the benefit of this disclosure will be able to identify an appropriate fluid for a particular application. In certain embodiments, the variable pressure weighting material particles have an internal pressure designed to tune the manner in which the density of the particles responds to downhole pressures. Generally, the internal pressure of the variable pressure weighting material particle may range from about 0 to about 100 psi. Generally, the internal pressure of the particles will be based on considerations such as the theoretical hydrostatic head to which the particles may be exposed, and the safety of the personnel.

The presence of an internal fluid within the variable pressure weighting material particles may permit compression and expansion of the variable pressure weighting material particles in a reversible manner, at any point. For example, in some embodiments where the treatment fluids of the present invention are used in subterranean drilling operations, the presence of an internal fluid within the variable pressure weighting material particles permits reversible compression and expansion of the variable pressure weighting material particles, in the well bore, on the ocean floor, or upon return to the drilling rig. Among other benefits, the incorporation of an internal fluid within the variable pressure weighting material particles may permit adjustment of the density of the variable pressure weighting material particles by pre-expanding them to a desired density. In certain exemplary embodiments, the variable pressure weighting material particles may be thermally pre-expanded. In certain exemplary embodiments, the variable pressure weighting material particles may be pre-expanded up to about 40 times their original volume before being added to the treatment fluid. In determining whether or not to heat a particular variable pressure weighting material particle, the benefit from thermally pre-expanding the variable pressure weighting material particle may be weighed against the cost in terms of manpower and energy to achieve such expansion. Further, while thermal pre-expansion may be suitable for certain exemplary embodiments of the variable pressure weighting material particles (e.g., the EXPANCEL particles), other embodiments of the variable pressure weighting material particles may be susceptible to thermal degradation from such heating. One of ordinary skill in the art, with the benefit of this disclosure, will be able to determine whether thermal pre-expansion is appropriate for a particular type of variable pressure weighting material particle. In certain exemplary embodiments where the variable pressure weighting material particles are to be thermally pre-expanded, the temperature to which the variable pressure weighting material particles are heated depends on factors such as, but not limited to, their chemical composition. For example, the glass transition temperature of the polymer used to make the variable pressure weighting material particles could affect the temperature to which the particles are heated. One of ordinary skill in the art, with the benefit of this disclosure, will be able to determine the appropriate temperature to which a particular type of variable pressure weighting material particle may be safely heated for a particular application.

An exemplary embodiment of a suitable variable pressure weighting material particle comprises a polymer that, at a given temperature and pressure, changes volume by expansion and contraction, and consequently, may change the density of the treatment fluid. Suitable polymers may include those which possess sufficient rubbery and elastic characteristics to allow the variable pressure weighting material particles to respond to, inter alia, changes in volume of the internal fluid within the variable pressure weighting material particle at temperatures and pressures commonly encountered in the subterranean formation. In certain exemplary embodiments of the present invention, the variable pressure weighting material particles comprise a copolymer of styrene and divinylbenzene. A commercially available example of variable pressure weighting material particles suitable for use in conjunction with the present invention are variable pressure weighting material particles comprising either a copolymer of styrene and acrylonitrile or a terpolymer of styrene, acrylonitrile and vinylidene chloride, and comprising an internal fluid, such as isobutane or the like. Such variable pressure weighting material particles are commercially available under the trade name "EXPANCEL" from Akzo Nobel, Inc., of Duluth, Ga. Several grades of EXPANCEL variable pressure weighting material particles with different polymer softening temperatures, allowing for expansion and contraction at different temperature ranges, are available. Depending on the conditions of the subterranean formation in which the variable pressure weighting material particles may be placed, a particular grade of EXPANCEL variable pressure weighting material particles may be suitable.

In some embodiments, the variable pressure weighting material particles may comprise such materials as elastomers, plastics and metals. An example of a suitable elastomer is a material such as Viton; an example of a suitable plastic is a material such as high molecular weight polyethylene; and examples of a suitable metal include materials such as beryllium copper and memory metals such as NiTi. When deciding upon the particular type of material for inclusion in the variable pressure weighting material particles, one of ordinary skill in the art with the benefit of this disclosure may choose to consider the fact that if the variable pressure weighting material particles comprise elastomers, and such elastomers subsequently fail at some point in the subterranean operation being performed, there will be minimal adverse impact to the treatment fluid because the elastomers have a low specific gravity, whereas if variable pressure weighting material particles comprising a metal subsequently fail, the variable pressure weighting material particle may increase the density of the treatment fluid. The diaphragm thickness of the variable pressure weighting material particles is an important consideration because, inter alia, the variable pressure weighting material particles must be able to flex when placed under pressure, thereby changing their volume and density as a function of pressure. For example, as the variable pressure weighting material particles flex inward their volume decreases, thereby increasing their density. The preferred thickness of the walls forming the variable pressure weighting material particles will vary depending on the material of choice. One of ordinary skill in the art with the benefit of this disclosure will be able to recognize the appropriate diaphragm thickness for a particular material.

In some embodiments, the substantial impermeability of the variable pressure weighting material particles to the treatment fluids of the present invention may also be achieved by appropriately encapsulating or coating a prefabricated variable pressure weighting material particle with appropriate materials. For example, a variable pressure weighting material particle intended for use in, inter alia, a nonaqueous-based drilling fluid may be coated or encapsulated with a hydrophilic material. A variable pressure weighting material particle intended for use in, inter alia, an aqueous-based drilling fluid may be coated or encapsulated with a hydrophobic material. Examples of suitable hydrophobic materials include, inter alia, silanes, silicone polymers, latexes, and the like. Examples of suitable hydrophilic materials include, inter alia, ethylene oxide, propylene oxide, acrylic acid, 2-acrylamido-2-methylpropane sulfonic acid, aminoalkoxysilanes, and the like. The preceding list is not intended to be an exhaustive list, but rather is intended merely to provide an illustration of some types of materials which may be suitable for use in accordance with embodiments of the present invention. Other materials may also be suitable, and one of ordinary skill in the art with the benefit of this disclosure will be able to identify an appropriate material for a particular application.

Figure 4:
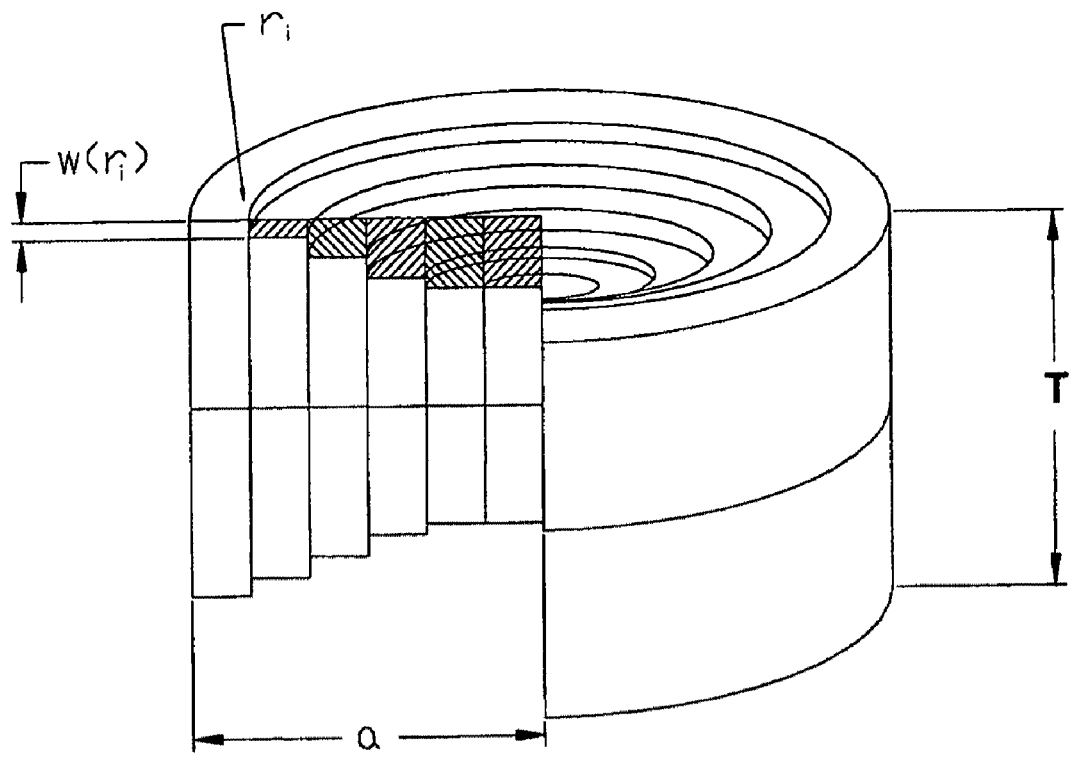
FIG. 4 shows a partial cross-section of an exemplary variable pressure weighting material particle of the present invention.
Figure 5:
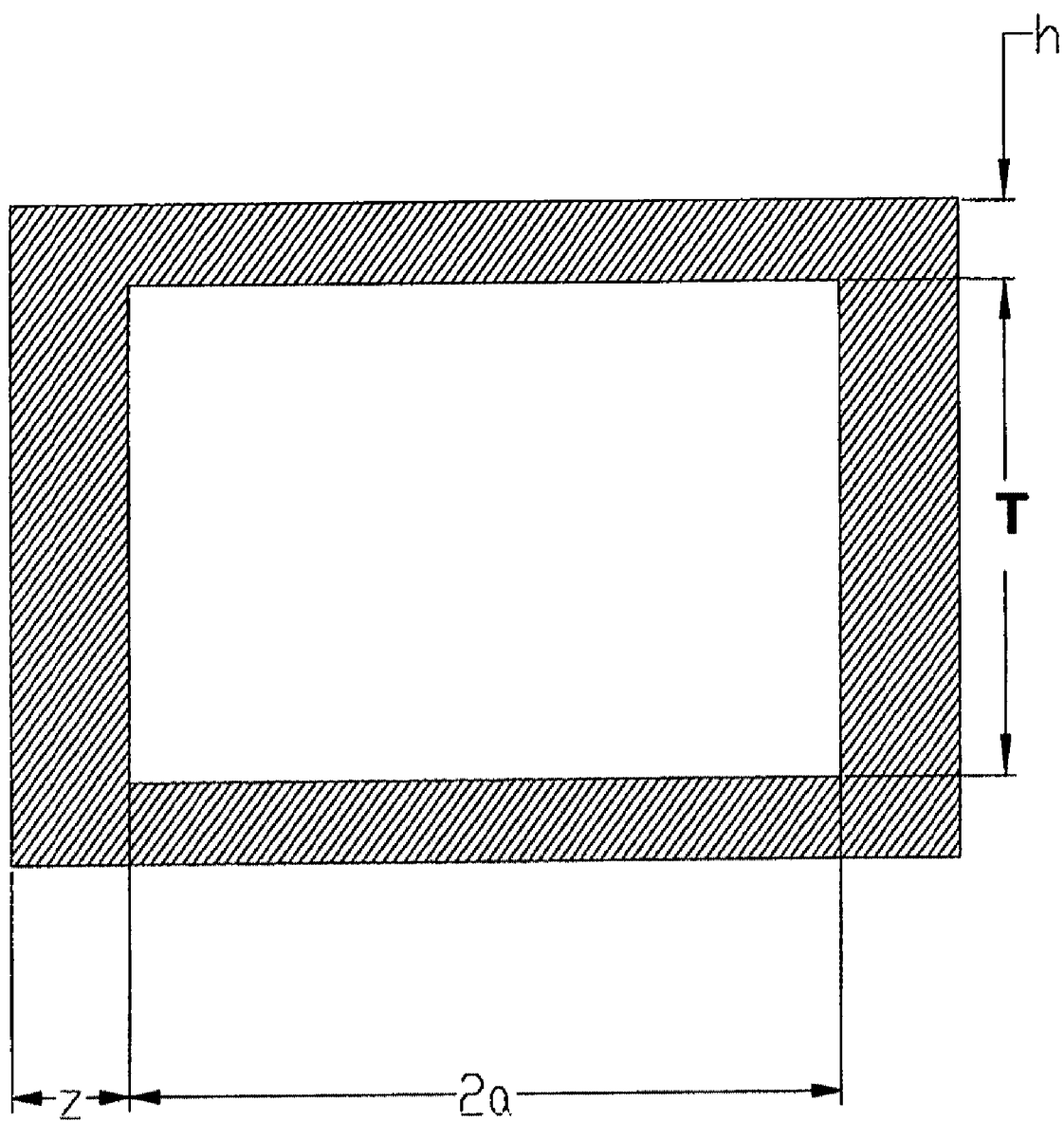
FIG. 5 is a cross-section of an exemplary disk-shaped variable pressure weighting material particle.

In some embodiments, the variable pressure weighting material particles may be configured in a wide variety of shapes. FIGS. 4 and 5 illustrate cross-sectional views of exemplary variable pressure weighting material particles. In certain preferred embodiments, the variable pressure weighting material particles are configured as hollow tubes or pipes. The overall size of the variable pressure weighting material particles is not critical to the current invention; however, in certain preferred embodiments the variable pressure weighting material particles will generally be small enough to pass through downhole tools without fouling or damaging the tool. Thus, in some embodiments, the external diameter of each variable pressure weighting material particle will generally be less than about ⅛ inch. When the particle is in the form of a hollow tube, one of ordinary skill in the art with the benefit of this disclosure will recognize the appropriate length to diameter ratio for a particular application. For example, it is thought that the efficiency of particle screening mechanisms decreases as a variable pressure weighting material particle becomes increasingly rod-like, e.g., as the length of the variable pressure weighting material particle increases relative to its diameter. In certain exemplary embodiments, the length to diameter ratio of the variable pressure weighting material particle may range from about 1:1 to about 2:1.

The variable pressure weighting material particles may be made by any process that produces variable pressure weighting material particles suitable for a particular application. One of ordinary skill in the art, with the benefit of this disclosure, will recognize the appropriate process to produce a variable pressure weighting material particle for a particular application. In one embodiment, the variable pressure weighting material particles are made by a process comprising the pressurization and sealing of a hollow rod or tube formed from an elastically deformable material. For example, a first end of a hollow rod or tube formed from an elastically deformable material may be crimped and sealed, after which the rod or tube may be pressurized to a desired pressure, after which a second end of the tube may be crimped and sealed. The tube may then be cut to form a variable pressure weighting material particle of a desired length.

Figure 2:
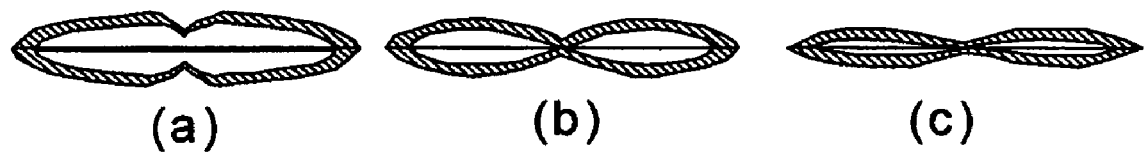
FIG. 2(a) shows a side view of an exemplary embodiment of a variable pressure weighting material particle of the present invention.
FIG. 2(b) shows a side view of the exemplary embodiment of FIG. 2(a), under compression.
FIG. 2(c) shows a side view of the exemplary embodiment of FIG. 2(a), under maximum compression.
FIG. 2(d) is a graphical representation of the pressure-density curve of the exemplary embodiment of FIGS. 2(a)-(c).
Figure 2D:
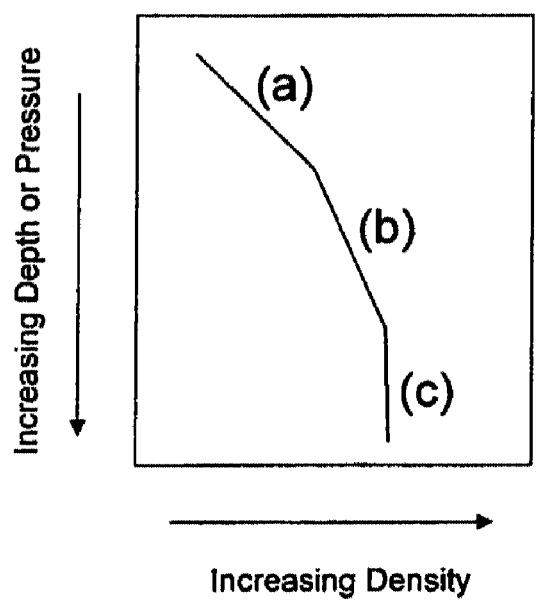

In another embodiment, the variable pressure weighting material particles may have the shape of a disk. One example of a suitable process for manufacturing such particles is a process comprising pressurizing and sealing an assembly of multiple sheets of elastically deformable material together. For example, a first sheet of elastically deformable material having a desirable thickness may be selected, and holes of a pre-designed diameter may be provided in such first sheet. The manufacturing process may be pressurized to a desired pressure, and a second and a third sheet of elastically deformable material may be placed on each side of the first sheet to form an assembly of sheets. The assembly may then be sealed together. A variable pressure weighting material particle may be produced, for example, by punching such variable pressure weighting material particle from the sealed assembly, with the punch diameter being slightly larger than the hole diameter, and concentric to it. In certain exemplary embodiments, the second and third sheets (e.g., the two outer sheets) may be dimpled to a certain depth, as exemplified in FIG. 2(a). Where such dimpling is provided, the first and third sheets of the variable pressure weighting material particle will flex inwards as external pressure increases, until they contact the first innermost sheet, as exemplified in FIG. 2(b); at such point the presence of the center support may cause the variable pressure weighting material particle to effectively become much stiffer. An exemplary embodiment of such variable pressure weighting material particle in a state of maximum compression may be seen in FIG. 2(c). A variable pressure weighting material particle configured with such dimpling may have a nonlinear pressure-density response that will shift functionally as the outer sheets touch the innermost sheet, as illustrated in FIG. 2(d). Optionally, other dimples may be added to provide a variable pressure weighting material particle having a pressure-density response with still further capability of shifting functionally. One of ordinary skill in the art with the benefit of this disclosure will recognize the applications where dimpling may be desirable, and will further recognize the appropriate depth of such dimples for a particular application.

An important consideration when selecting a particular material for use as a variable pressure weighting material particle is the amount of stress which will be imposed upon the variable pressure weighting material particle when in use. Generally, as the variable pressure weighting material particle encounters progressively higher external pressure, the bending stresses in the walls of the variable pressure weighting material particle will increase. If the bending stresses exceed the yield stress of the wall material, then the variable pressure weighting material particle will be permanently deformed, which may result in a shift in the pressure-density response curve for the variable pressure weighting material particle. This may be particularly true for embodiments where the variable pressure weighting material particle comprises metal or plastic. Accordingly, the increased resiliency of elastomers as compared to metal or plastic materials may be a relevant consideration when designing a particular variable pressure weighting material particle.

The relationship between external pressure and the density of a variable pressure weighting material particle may be altered in a variety of ways, including but not limited to changing: the type of fluid within the variable pressure weighting material particle; the internal pressure of the variable pressure weighting material particle; the diaphragm thickness of the variable pressure weighting material particle; the shape of the variable pressure weighting material particle, the number and location of dimples of a variable pressure weighting material particle, and the like. One of ordinary skill in the art with the benefit of this disclosure will recognize the appropriate means by which the pressure-density relationship of a variable pressure weighting material particle may be modified for a particular application.

In some embodiments, the quantity of variable pressure weighting material particles to be included in the treatment fluids of the present invention may be determined based on considerations including, inter alia, the specific gravity and compressibility of the variable pressure weighting material particle. For example, where the treatment fluids are used in subterranean drilling operations, the quantity of variable pressure weighting material particles to be included in the treatment fluid will further depend on additional considerations, including, inter alia, the depth of the ocean floor, the depth of the borehole and the overall volume of the borehole and riser. Generally, in some embodiments, when the treatment fluids of the present invention are used in subterranean drilling operations, the variable pressure weighting material particles will be present in the treatment fluid in an amount sufficient so that the density of the fluid may vary such that the treatment fluid provides a desired degree of operational control (e.g., prevents undesirable influx into the well bore of fluids from a region of the subterranean formation surrounding the well bore) when circulating through the subterranean formation, and can return through the riser to the surface without the necessity of additional pumps or subsurface additives. Such additional pumps or additives may be useful, however, if desired. More particularly, in some embodiments, the portion of variable pressure weighting material particles may be present in the treatment fluids of the present invention in an amount in the range of from about 0.01% to about 80% by volume of the treatment fluid. One of ordinary skill in the art with the benefit of this disclosure will recognize the appropriate quantity of variable pressure weighting material particles to include within the treatment fluid for a given application, and will also recognize the appropriate balance of base fluid and variable pressure weighting material particles to include within the treatment fluids of the present invention in order to provide pumpable treatment fluids.

Among other benefits, in some embodiments, the presence of the variable pressure weighting material particle in the treatment fluids of the present invention allows the density of the treatment fluid to vary as a function of pressure. For instance, as the variable pressure weighting material particles encounter higher downhole pressures, they compress, thereby lowering their volume, as illustrated in FIG. 1. The reduction in the volume of the variable pressure weighting material particles in turn increases the density of the treatment fluid. In some embodiments, when the variable pressure weighting material particles are fully compressed the treatment fluid may typically have a density in the range of from about 0.01% to about 300% higher than their density measured at sea level. For example, in some embodiments, where the treatment fluids of the present invention are used in a subterranean drilling operation, such treatment fluids may flow downward through a drill pipe, exit a drill bit, and recirculate upward through the borehole and into the lower pressure region of a riser connecting the borehole to the surface. Within the riser, the pressure on such treatment fluid decreases, giving rise to a corresponding decrease in the density of the treatment fluid, as the variable pressure weighting material particles begin to expand and increase in volume due to the drop in external pressure. The increase in volume of the variable pressure weighting material particles in turn reduces the overall density of the treatment fluid. In certain preferred embodiments where the treatment fluids are used in a subterranean drilling operation, the resulting drop in density may be sufficient to permit the return of the treatment fluid through the riser to the surface without any additional pumps or subsurface additives.

Among other benefits, the variable density nature of some treatment fluids of the present invention may prove useful in, inter alia, subterranean drilling operations by, inter alia, eliminating the need to lighten a drilling fluid as it returns to the surface through the injection of rigid spheres at the sea floor. The variable density nature of some treatment fluids of the present invention also may eliminate the need for auxiliary pumps located on the sea floor to assist in pumping a returning drilling fluid to the surface. The variable density nature of some treatment fluids of the present invention may also minimize loss of circulation of a drilling fluid into regions of the subterranean formation adjacent to the bore hole, inter alia, because the variable density fluid may be formulated so that its density is sufficient to provide a desired degree of operational control (e.g., prevent undesirable influx into the well bore of fluids from a region of the subterranean formation surrounding the well bore) yet avoid fracturing a region of the subterranean formation. For example, at shallower depths where the formation may be more easily fractured inadvertently, the treatment fluid may have a lower density at such shallower depths, and subsequently have a higher density at greater depths. Among other benefits, this may reduce or eliminate the need to solve the problem of lost circulation by remedial treatment, installing costly additional strings of casing within the well bore, and/or setting plugs and side tracking. The variable density nature of some treatment fluids of the present invention also may impart benefits to onshore wells, as well. For example, when used in onshore wells having a narrow difference between pore pressure and fracture gradient, a drilling fluid comprising a treatment fluid of the present invention may provide a sufficient degree of operation control without fracturing the subterranean formation inadvertently, or without necessitating the installation of casing to prevent such inadvertent fracturing.

In certain preferred embodiments, the treatment fluids of the present invention may permit, inter alia, the drilling of a borehole having a diameter that differs no more than about 25% along the length of the borehole. For instance, in such borehole the bottom diameter of the casing will not differ from the top diameter by more than about 25%. In certain preferred embodiments, the treatment fluids of the present invention may permit, inter alia, the drilling of an offshore borehole having a diameter that is substantially the same along the length of the borehole, e.g., where the diameter of the borehole differs by no more than about 1% to about 5% at any two points along its length. In certain preferred embodiments, the treatment fluids of the present invention may permit, inter alia, the drilling of an offshore borehole comprising strings of casing the substantial majority of which are made from the same piping schedule. In certain preferred embodiments, the treatment fluids of the present invention may permit, inter alia, the drilling of an offshore borehole using a single formulation of the same treatment fluid throughout all phases of the drilling process, e.g., where there is no need to switch drilling fluid formulations while drilling the borehole.

Furthermore, in some embodiments, the treatment fluids of the present invention may be used in drilling wells in formations comprising thief zones. As referred to herein, the term "thief zones" will be understood to mean segments of a subterranean formation which are already sufficiently fractured (before or during drilling) as to potentially cause the loss of circulation of drilling fluids out of the well bore into such fractures. In some embodiments, where the treatment fluids of the present invention are used in formations comprising thief zones, a portion of the treatment fluid may flow into such thief zones, and expand under the lower pressures typically found therein to seal them off from the well bore, to prevent further loss of circulation. Lower pressures may exist within the thief zones because, inter alia, such zones may provide a broad flow area and because of frictional losses which may occur as the treatment fluids travel through the formation. One of ordinary skill in the art with the benefit of this disclosure will recognize the amount and type of variable pressure weighting material particles to include within the treatment fluids of the present invention in order to optimize the expansion and sealing capability of the treatment fluid for a particular application.

The use of treatment fluids of the present invention may also benefit other subterranean applications as well. For example, where such treatment fluids are used as fracturing or acidizing fluids, the variable density nature of the treatment fluid may permit easier recovery of the spent fracturing or acidizing fluid from the subterranean formation at the end of the operation, thereby eliminating the need to use additional manpower or pumping equipment to accomplish such task.

In some embodiments, the treatment fluids of the present invention also optionally may comprise fixed-density weighting agents. Such fixed-density weighting agents are typically heavy minerals such as barite, hematite, ilmenite, calcium carbonate, iron carbonate, or the like. The fixed-density weighting agents are relatively inexpensive compared to the variable pressure weighting material particles of the present invention. However, the density of such fixed-density weighting agents will not be able to vary with pressure as will the density of the variable pressure weighting material particles. Where used, these fixed-density weighting agents may increase the density of the treatment fluid sufficiently, inter alia, to offset high pressures which may be encountered during certain phases of the drilling operation. In determining the relative amounts of fixed-density weighting agents and variable pressure weighting material particles to add to the treatment fluid to affect the treatment fluid's density, the added expense produced by the use of variable pressure weighting material particles may be considered in light of the degree of improved density control and operability that the resulting treatment fluid may develop through the use of such variable pressure weighting material particles. One of ordinary skill in the art with the benefit of this disclosure will recognize the appropriate balance for a given application. Where used, in some embodiments, the fixed-density weighting agents are generally present in the treatment fluid in an amount in the range of from about 0.01% to about 40% by volume of the base fluid.

In some embodiments, the treatment fluids of the present invention also optionally may comprise salts. Examples of suitable salts include soluble salts of Group IA and Group IIA alkali and alkaline earth metal halides, as well as acetates, formates, nitrates, sulfates and the like. As used herein, the terms "Group IA" and "Group IIA" will be understood to mean those elements depicted as belonging to either Group IA or Group IIA, respectively, as shown on the periodic table of the elements found in the endpapers of John McMurry, *Organic Chemistry* (2d. ed. 1988). In certain preferred embodiments, wherein the treatment fluids of the present invention comprise an aqueous base fluid, salts such as sodium chloride, sodium bromide, potassium chloride, sodium formate, and potassium formate are preferred. In certain other preferred embodiments, wherein the treatment fluids of the present invention comprise a non-aqueous base fluid, calcium chloride, potassium chloride, sodium chloride, and sodium nitrate are preferred. One of ordinary skill in the art with the benefit of this disclosure will recognize the appropriate salt for a particular application.

In some embodiments, additional additives may be added to the treatment fluids of the present invention as deemed appropriate by one skilled in the art. Where the treatment fluid comprises an aqueous base fluid, the treatment fluid may further comprise additives such as shale inhibitors, viscosifiers, fluid loss control additives, filtration control agents, pH control agents, and the like. Examples of suitable shale swelling inhibitors include, but are not limited to, polyacrylamides, partially hydrolyzed polyacrylamides, amines, polyglycols and the like. An example of a suitable partially hydrolyzed polyacrylamide is commercially available under the tradename "EZMUD®," from Halliburton Energy Services, Inc., of Houston, Tex. An example of a suitable polyglycol is commercially available under the tradename "GEM," from Halliburton Energy Services, Inc., of Houston, Tex. Examples of suitable viscosifiers include clays, high molecular weight biopolymer polysaccharides, hydroxyethylcellulose, and the like. Examples of suitable clays are a sodium montmorillonite clay commercially available from Halliburton Energy Services, Inc., of Houston, Tex., under the tradename "AQUAGEL®"; and an attapulgite clay commercially available from Halliburton Energy Services, Inc., of Houston, Tex., under the tradename "ZEOGEL®." An example of a suitable high molecular weight biopolymer polysaccharide is commercially available under the tradename "BARAZAN®" from Halliburton Energy Services, Inc., of Houston, Tex. An example of a suitable hydroxyethylcellulose is commercially available from Halliburton Energy Services, Inc., of Houston, Tex., under the tradename "LIQUI-VIS®." In certain preferred embodiments of the treatment fluids of the present invention, BARAZAN® is used as the viscosifier when the treatment fluid comprises an aqueous base fluid. Examples of suitable filtration control agents include starches, modified starches, carboxymethylcellulose, polyanionic cellulose, polyacrylates, and the like. An example of a suitable starch is commercially available from Halliburton Energy Services, Inc., of Houston, Tex., under the tradename "IMPERMEX." An example of a suitable modified starch is commercially available from Halliburton Energy Services, Inc., of Houston, Tex., under the tradename "FILTER-CHEK®." An example of a suitable carboxymethylcellulose is commercially available from Halliburton Energy Services, Inc., of Houston, Tex., under the tradename "CELLEX." An example of a suitable polyanionic cellulose is commercially available from Halliburton Energy Services, Inc., of Houston, Tex., under the tradename "PAC." An example of a suitable polyacrylate is commercially available from Halliburton Energy Services, Inc., of Houston, Tex., under the tradename "POLYAC®." In certain preferred embodiments of the treatment fluids of the present invention, FILTER-CHEK® or PAC is used as the filtration control agent when the treatment fluid comprises an aqueous base fluid. Examples of suitable pH control agents include sodium hydroxide, potassium hydroxide, calcium hydroxide, magnesium oxide, and the like. An example of a suitable source of magnesium oxide is commercially available from Halliburton Energy Services, Inc., of Houston, Tex., under the tradename "BARABUF®." In certain preferred embodiments of the treatment fluids of the present invention, sodium hydroxide or potassium hydroxide is used as the pH control agent when the treatment fluid comprises an aqueous base fluid.

In some embodiments, where the treatment fluids of the present invention comprise a non-aqueous base fluid, the treatment fluids may further comprise additives such as emulsifiers, viscosifiers, fluid loss control additives, filtration control agents, pH control agents, and the like. Examples of suitable emulsifiers include polyaminated fatty acids, concentrated tall oil derivatives, blends of oxidized tall oil and polyaminated fatty acids, and the like. Examples of suitable commercially available polyaminated fatty acids are commercially available from Halliburton Energy Services, Inc., of Houston, Tex., under the tradenames "EZMUL" and "SUPERMUL." An example of a suitable commercially available concentrated tall oil derivative is commercially available from Halliburton Energy Services, Inc., of Houston, Tex., under the tradename "FACTANT." Examples of suitable commercially available blends of oxidized tall oil and polyaminated fatty acids are commercially available from Halliburton Energy Services, Inc., of Houston, Tex., under the tradenames "INVERMUL®" and "LE MUL." Examples of suitable viscosifiers include clays, modified fatty acids, and the like. An examples of a suitable clay is an organophilic clay commercially available from Halliburton Energy Services, Inc., of Houston, Tex., under the tradename "GELTONE." Examples of suitable modified fatty acids are commercially available from Halliburton Energy Services, Inc., of Houston, Tex., under the tradenames "RHEMOD-L" and "TEMPERUS." Examples of suitable filtration control agents include lignites, modified lignites, powdered resins, and the like. An example of a suitable commercially available lignite is commercially available from Halliburton Energy Services, Inc., of Houston, Tex., under the tradename "CARBONOX." An example of a suitable commercially available modified lignite is commercially available from Halliburton Energy Services, Inc., of Houston, Tex., under the tradename "BARANEX." An example of a suitable commercially available powdered resin is commercially available from Halliburton Energy Services, Inc., of Houston, Tex., under the tradename "BARABLOK." Examples of suitable pH control agents include, but are not limited to, calcium hydroxide, potassium hydroxide, sodium hydroxide, and the like. In certain exemplary embodiments wherein the treatment fluids of some embodiments of the present invention comprise a non-aqueous base fluid, calcium hydroxide is a preferred pH control agent.

In some embodiments, the variable pressure weighting material particles may be placed within the treatment fluids of the present invention in a variety of ways. For example, in some embodiments where the treatment fluids of the present invention are used in subterranean drilling operations, the variable pressure weighting material particles may be added to the treatment fluid at the surface (e.g., on the drilling rig or drill ship), or through injection below the surface (e.g., by injection into the treatment fluid in the riser), or by any combination of surface and subsurface addition.

While a number of preferred embodiments described herein relate to drilling fluids and compositions, it is understood that any well treatment fluid such as drilling, completion and stimulation fluids including, but not limited to, drilling muds, well cleanup fluids, workover fluids, spacer fluids, gravel pack fluids, acidizing fluids, fracturing fluids, and the like, may be prepared using a treatment fluid of the present invention. Accordingly, an example of a method of the present invention is a method of using a treatment fluid in a subterranean formation comprising introducing a fluid having a density that varies as a function of pressure into the subterranean formation, wherein the fluid comprises a base fluid and a portion of variable pressure weighting material particles. Additional steps include drilling, completing and/or stimulating a subterranean formation using the treatment fluid; and producing a fluid, e.g., a hydrocarbon fluid such as oil or gas, from the subterranean formation.

An example of a composition of the present invention comprises 70% water by volume of the treatment fluid and 25% variable pressure weighting material particles by volume of the treatment fluid, with the remaining 5% by volume of the treatment fluid comprising a viscosifier, a shale inhibitor, and a fluid loss control additive. Another example of a composition of the present invention comprises 50% mineral oil by volume of the treatment fluid and 25% variable pressure weighting material particle by volume of the treatment fluid, with the remaining 25% by volume of the treatment fluid comprising a viscosifier, a fluid loss control additive, and a salt solution emulsified within the mineral oil. An example of a drilling fluid composition of the present invention comprises about 75% water by volume and about 25% variable pressure weighting material particles by volume.

The cement compositions of the present invention generally comprise a hydraulic cement, one or more variable pressure weighting material particles, and a base fluid such as water. Non-flexible beads such as glass hollow beads, cenospheres, and ceramic hollow spheres may also be added to the cement compositions.

In the cement composition embodiments, any variable pressure weighting material particle that may expand and contract and that is compatible with a cement (i.e., chemically stable over time upon incorporation into the cement) may be combined with the cement to reduce its density. The variable pressure weighting material particle may be a flexible bead, flexible bead as used herein refers to a bead that may expand and contract without adverse effect to the structure of the bead in response to changes in pressure and/or temperature. Preferred variable pressure weighting material particles are substantially hollow objects filled with fluid (preferably gas), preferably spherical or substantially spherical in shape, and having a flexible outer wall. Preferred variable pressure weighting material particles have a diameter of about 6 to 150 micrometers at 25° C. and atmospheric pressure. Preferably, the fluid inside the variable pressure weighting material particle is air, carbon dioxide, an inert gas such as nitrogen, or an organic liquid with a low boiling point such as n-butane, isobutane or pentane. Preferably, the variable pressure weighting material particles have a substantially uniform, flexible outer wall comprising of one or more elastomeric materials or polymers. The temperature at which the elastomeric material melts or becomes so soft that it loses its ability to contain the fluid and/or expand and contract is desirably higher than the temperature in the well bore, which may range from about 120° F. to about 400° F. The elastomeric material is preferably a styrenic polymer, more preferably a copolymer of methylmethacrylate and acrylonitrile or a terpolymer of methylmethacrylate, acrylonitrile, and vinylidene dichloride. Variable pressure weighting material particles composed of this copolymer and this terpolymer are commercially available from Akzo Nobel, Inc., which is located in Duluth, Ga., under the tradename EXPANCEL. Several grades of EXPANCEL particles are available and may be selected depending upon the degree of expansion, the physical state, and the temperature range for a given application. Other suitable materials that may be used to form the flexible wall include, but are not limited to, a styrene-divinylbenzene copolymer, polystyrene, and a phenolic resin. Hollow polystyrene particles are available from many polystyrene suppliers, such as Huntsman Corporation of Houston, Tex. (sold as GRADE 27, GRADE 51, or GRADE 55) and BASF Corporation of North Mount Olive, N.J. (sold under the tradename STYROPOR). In some embodiments, the variable pressure weighting material particles are incorporated into the cement in a concentration of preferably from about 1% to about 200% by weight of the cement (bwoc), more preferably from about 2% to about 100%, and most preferably from about 5% to about 50%.

In some cement related embodiments, the variable pressure weighting material particles are mixed with the cement before pumping the cement slurry into a well bore. In some embodiments, the variable pressure weighting material particles may be expanded before mixing with the cement, such that the ensuing cement compositions will have a desired density, by heating the variable pressure weighting material particles to soften the wall of the particle and to increase the pressure of the fluid (e.g., gas) therein. Preferred variable pressure weighting material particles are capable of expanding up to 8 times their original diameters (i.e., the diameter at 25° C. and atmospheric pressure). For example, EXPANCEL particles having a diameter in the range of 6 to 40 microns, upon expansion increase to a diameter of 20 to 150 microns. When exposed to heat, the particles can expand up to forty times or greater their original volumes. The expansion of the particles is generally measured by the decrease in the specific gravity of the expanded material. Thus, for example, when EXPANCEL particles are heated to above 212° F., the density of the particles decreases from 1,000 grams per liter for the unexpanded particles to about 30 grams per liter for the expanded particles. The temperature at which the variable pressure weighting material particles are heated depends on the polymer composition of the particle wall and the desired density of the cement composition, which is typically in a range of from about 6 to about 23 lb/gal. The variable pressure weighting material particle may be added to the cement composition by dry blending with the cement before the addition of a fluid such as water, by mixing with the fluid to be added to the cement, or by mixing with the cement slurry consecutively with or after the addition of the fluid. The particles may be presuspended in water and injected into the cement mix fluid or into the cement slurry as an aqueous slurry. Surfactants may be added to the composition to water-wet the surface of the particles so that they will remain suspended in the aqueous phase even if the density of the particles is less than that of the water. The surfactants are preferably nonionic, with a Hydrophile-Lipophile Balance values in the range 9-18. The ability of a surfactant to emulsify two immiscible fluids, such as oil and water, is often described in terms of Hydrophile-Lipophile balance (HLB) values. These values, ranging from 0 to 40, are indicative of the emulsification behavior of a surfactant and are related to the balance between hydrophilic and lipophilic portions of the molecules. In general, surfactants with higher HLB values are more hydrophilic than those with lower HLB values. As such, they are generally more soluble in water and are used in applications where water constitutes the major or external phase and a less polar organic fluid constitutes the minor or internal phase. Thus, for example, surfactants with HLB values in the range 3-6 are suitable for producing water-in-oil emulsions, whereas those with HLB values in the 8-18 range are suitable for producing oil-in-water emulsions. A commonly used formula for calculating HLB values for nonionic surfactants is given below:

$$HLB = 20 \times M_H/(M_H + M_L)$$

where $M_H$ is the formula weight of the hydrophilic portion of the molecule and $M_L$ is the formula weight of the lipophilic portion of the molecule.

When mixtures of surfactants are used, the overall HLB values for the mixtures are calculated by summing the HLB contributions from different surfactants as shown in equation below:

$$HLB = (\phi_1' \times HLB_1 + \phi_2' \times HLB_2 + \ldots + \ldots \text{etc.},)$$

where $\phi_1'$ is the weight fraction of surfactant #1 in the total mixture, $HLB_1$ is the calculated HLB value of surfactant #1, $\phi_2'$ is the weight fraction of surfactant #2 in the total surfactant mixture, and $HLB_2$ is the calculated HLB value of the surfactant #2, and so on.

It has been observed that a mixture of a preferentially oil-soluble surfactant and a preferentially water-soluble surfactant provides better and more stable emulsions. In particular, non-ionic ethoxylated surfactant mixtures containing from about 4 to about 14 moles of ethylene oxide. The HLB ratio for a single surfactant or a surfactant mixture employed in the present invention preferably ranges from about 7 to about 20, more preferably from about 8 to about 18.

In one embodiment, a cement slurry densified by using a lower water to cement ratio is lightened to a desired density by the addition of unexpanded or pre-expanded variable pressure weighting material particles in order to make the final cement less brittle.

In another embodiment, hollow, non-flexible beads are mixed with the cement and the variable pressure weighting material particles. Particularly suitable non-flexible beads are cenospheres, which are commercially available from, for example, PQ Corporation of Valley Forge, Philadelphia under the tradename EXTENDOSPHERES, from Halliburton Energy Services Inc. under the tradename SPHERELITE, and from Trelleborg Fillite Inc. of Atlanta, Ga. under the tradename FILLITE. Alternatively, the non-flexible beads may be glass beads or ceramic beads. The non-flexible beads, particularly the industrial waste product of the cenosphere type, are relatively inexpensive as compared to the polymeric elastic particles. However, the non-flexible beads are more likely to break when subjected to downhole temperature and pressure changes and provide brittle cement compositions.

The presence of the variable pressure weighting material particles in the cement composition provides several benefits. For example, the variable pressure weighting material particles protect the ensuing hardened cement from experiencing brittle failure during the life of the well even if some of the non-flexible beads collapse. That is, the flexible wall and the gas inside of each particle contracts under pressure and expands back to its original volume when the pressure is removed, thus providing a mechanism for absorbing the imposed stress. The absorption of energy by the flexible wall is expected to reduce the breakage of the more brittle beads when such compositions are used. The flexible wall and the enclosed fluid also expand when the temperature in the well bore increases, and they contract when the temperature decreases. Further, the variable pressure weighting material particles improve the mechanical properties of the ensuing cement, such as its ductility and resilience. Cement comprising variable pressure weighting material particles gains the following beneficial physical properties as compared to the same cement composition without the variable pressure weighting material particles: lower elastic (Young's) modulus, greater plastic deformation, increased tensile strength, and lower Poisson's ratio without significantly compromising other desirable properties such as compressive strength.

In determining the relative amounts of variable pressure weighting material particles and non-flexible beads to add to the cement composition to decrease its density, the additional costs incurred by using the variable pressure weighting material particles should be weighed against the benefits provided by using the variable pressure weighting material particles. For example, the amount of variable pressure weighting material particles added to the cement may be in the range of from about 2% bwoc to about 20% bwoc, and the amount of non-flexible beads in the cement may be in the range of from about 10% bwoc to about 100% bwoc.

Any known cement may be utilized in the present invention, including hydraulic cements composed of calcium, aluminum, silicon, oxygen, and/or sulfur which set and harden by reaction with water. Examples of suitable hydraulic cements are Portland cements, pozzolana cements, gypsum cements, high alumina content cements, silica cements, and high alkalinity cements. The cement is preferably a Portland cement, more preferably a class A, C, G, or H Portland cement, and most preferably a class A, G, or H Portland cement. A sufficient amount of fluid is also added to the cement to form a pumpable cementitious slurry. The fluid is preferably fresh water or salt water, i.e., an unsaturated aqueous salt solution or a saturated aqueous salt solution such as brine or seawater. The amount of water present may vary and is preferably selected to provide a cement slurry having a desired density. The amount of water in the cement slurry is preferably in a range of from about 30% bwoc to about 120% bwoc, and more preferably in a range of from about 36% bwoc to about 54% bwoc.

As deemed appropriate by one skilled in the art, additional additives may be added to the cement composition for improving or changing the properties of the ensuing hardened cement. Examples of such additives include, but are not limited to, set retarders such as lignosulfonates, fluid loss control additives, defoamers, dispersing agents, set accelerators, and formation conditioning agents. Other additives that may be introduced to the cement composition to prevent cement particles from settling to the bottom of the fluid are, for example, bentonite and silica fume, which is commercially available from Halliburton Energy Services Inc. under the tradename SILICALITE. Further, a salt such as sodium chloride may be added to the cement composition when the drilling zone has a high salt content.

In preferred cement embodiments, a well cementing process is performed using the cement composition containing the variable pressure weighting material particles. The well cementing process includes drilling a well bore down to the subterranean zone while circulating a drilling fluid through the well bore. A string of pipe, e.g., casing, is then run in the well bore. The drilling fluid is conditioned by circulating it downwardly through the interior of the pipe and upwardly through the annulus, which is located between the exterior of the pipe and the walls of the well bore. The cement composition comprising variable pressure weighting material particle is then displaced down through the pipe and up through the annulus, where it is allowed to set into a hard mass. In alternative embodiments, the cement composition may be used for other projects such as masonry or building construction.

To facilitate a better understanding of the present invention, the following examples of certain aspects of some embodiments are given. In no way should the following examples be read to limit, or define, the entire scope of the invention.

EXAMPLE 1

The effect of the variable pressure weighting material particles on certain embodiments of the treatment fluids of the present invention may be illustrated by considering a hypothetical drilling fluid of the present invention comprising 20% variable pressure weighting material particles by volume, the variable pressure weighting material particles having a specific gravity of about 0.41 and an isothermal compressibility factor of about $1.5 \times 10^{-4}$ (1/psi), and further comprising 80% base fluid by volume, the base fluid having a density of about 10 lb/gallon. The following equations may be used to calculate the density of the treatment fluid at different depths.

The change in volume of the variable pressure weighting material particle as the external pressure changes may be determined from the relationship:

$$dv = \left(\frac{\partial v}{\partial p}\right) dp \qquad \text{Equation 1}$$

or $$\frac{dv}{v} = \frac{1}{v}\left(\frac{\partial v}{\partial p}\right) dp = C dp \qquad \text{Equation 2}$$

In Equation 2, the value "C" is the compressibility of the elastic particle. If the elastic particle is subjected to a change in pressure of dp, then the new volume of the elastic particle is given by:

$$v_{new} = v_{old} + dv \qquad \text{Equation 3}$$

and the new density is then calculated.

From the surface to a depth of 2,500 feet, the change in pressure is 1,129 psi, which will cause the volume of the elastic particles to change by 17%, using Equation 2. Using Equation 3, the density at 2,500 feet is then calculated to be 9 lb/gallon. The calculated density of the hypothetical variable density fluid at increasing depths is shown in Table 1 below.

TABLE 1

| Depth (feet) | Equivalent Fluid Density (lb/gallon) |
|---|---|
| 0 | 8.7 |
| 2,500 | 9.0 |
| 5,000 | 9.3 |
| 7,500 | 9.7 |
| 10,000 | 10.0 |

EXAMPLE 2

A cement slurry containing EXPANCEL elastic particles in accordance with the present invention was formed by mixing together the following components according to the procedure described in American Petroleum Institute (API) Specification 10, $5^{th}$ Edition, Jul. 1, 1990: class H cement, water (117.20% bwoc); SILICALITE silica fume (16.9% bwoc); bentonite (4.0% bwoc); HALAD-344 fluid loss additive available from Halliburton Energy Services (0.5% bwoc); SCR-100 cement set retarder available from Halliburton Energy Services (0.3% bwoc); sodium chloride (18% bwoc); and defoamer (0.025 gal/sk). A dry mixture of SPHERELITE cenospheres available from Halliburton Energy Services (55% bwoc) and EXPANCEL 53 WU particles (10% bwoc), which are composed of a copolymer of methyl methacrylate and acrylonitrile having a softening temperature above 200° F., was added to the slurry with slow agitation. The slurry was subjected to a pressure of 4,000 psi in an autoclave to simulate the breakage of the cenospheres under downhole conditions. The slurry density values before and after pressurizing are reported in Table 2 below. A portion of the cement slurry was then poured into 2"×2"×2" brass cube molds and cured at 135° F. in a pressure chamber under a pressure of 5,200 psi. Another portion of the slurry was poured into 1"×2" cylindrical steel molds and cured at the same temperature. The compressive strengths were measured on 2"×2"×2" molds using strength testing equipment manufactured by Tinius Olsen of Willow Grove, Pa., according to American Society for Testing and Materials (ASTM) procedure C190-97. A load versus displacement study was performed on 1"×2" cylinders using a MTS load frame instrument manufactured by MTS Systems Corporation of Eden Prairie, Minn. without using any confining pressures (shown below in Tables 3 and 4).

EXAMPLE 3

The procedure of Example 2 was followed except that the EXPANCEL 53 particles were replaced with EXPANCEL 820 WU particles, which are composed of a terpolymer of methylmethacrylate, vinylidene dichloride, and acrylonitrile having a softening temperature above 167° F.

EXAMPLE 4

The procedure of Example 2 was followed except that the EXPANCEL 53 particles were replaced with EXPANCEL 551 WU particles, which are composed of a terpolymer of methylmethacrylate, vinylidene dichloride, and acrylonitrile having a softening temperature above 200° F.

COMPARATIVE EXAMPLE 1

Conventional cement slurry containing SPHERELITE non-flexible beads but no elastic particles was formed by mixing together the following components: class H cement, water (117.20% bwoc); SILICALITE silica fume (16.9% bwoc); bentonite (4.0% bwoc); HALAD-344 fluid loss additive (0.5% bwoc); SCR-100 cement set retarder (0.3% bwoc); sodium chloride (18% bwoc); defoamer (0.025 gal/sk); and SPHERELITE beads (65% bwoc). The cement slurry was cured in the same manner as described in Example 2. The compressive strength and load versus displacement analysis were also performed as described in Example 2. Note that the density values for the slurries in Examples 2-4 and that of the slurry in Comparative Example 1 are essentially identical considering the experimental error in the method of measurement (see Table 2).

TABLE 2

| | Example 2 | Example 3 | Example 4 | Comparative Example 1 |
|---|---|---|---|---|
| SPHERELITE Beads, % bwoc | 55 | 55 | 55 | 65 |
| EXPANCEL 53 Particles, % bwoc | 10 | — | — | — |
| EXPANCEL 820 Particles, % bwoc | — | 10 | — | — |
| EXPANCEL 551 Particles, % bwoc | — | — | 10 | — |

TABLE 2-continued

| | Example 2 | Example 3 | Example 4 | Comparative Example 1 |
|---|---|---|---|---|
| Slurry Density, ppg @ atm. Pressure | 10.5 | 10.5 | 10.4 | 10.4 |
| Slurry Density, ppg after pressurizing @ 4000 psi for 5 min. | 11.3 | 11.3 | 11.3 | 11.3 |

The bulk mechanical properties of the cements in the examples and comparative examples are shown below in Table 3:

TABLE 3

| | Compressive Strength @ 135° F. for 24 hrs, psi | Poisson's Ratio | Young's Modulus e(+6), psi |
|---|---|---|---|
| Example 2 | 1820 | 0.193 | 0.763 |
| Example 3 | 1920 | 0.196 | 0.768 |
| Example 4 | 2120 | 0.194 | 0.683 |
| Comparative Example 1 | 1675 | 0.221 | 0.82 |

As shown in Table 3, the compressive strengths of the cements containing both flexible, compressible and non-flexible beads (Examples 2-4) are greater than the compressive strengths of the cement containing only non-flexible beads (Comparative Example 1). The Young's Modulus values of the cements in Examples 2-4 are lower than the Young's modulus value of the cement in Comparative Example 1; indicating that replacement of a portion of the brittle beads with elastic particles decreased the brittleness and improved the resiliency of the composition. Young's Modulus measures the interparticle bonding forces and thus the stiffness of a material. As such, the cements in Examples 2-4 are less stiff than the cement in Comparative Example 1, which contains no flexible, compressible heads, and at the same time remain resilient up to higher stress levels.

This result is surprising because, in general, when a softer or a more flexible (lower Young's modulus) material is added to a brittle material, the final composition has a lower compressive strength as well as a lower Young's modulus. In the present case, even though the Young's modulus decreased as expected, the compressive strength increased, suggesting synergistic interaction between the elastic particles and the non-flexible, brittle beads. Without being limited by theory, it is believed that the stress imposed in a compressive mode is absorbed effectively by the elastic particles, resulting in increased load values at which the brittle beads, and thus the entire composition fails.

The mechanical properties at the yield points of the cements formed in Examples 2-4 and Comparative Example 1 were obtained from the load vs. displacement data analysis. These mechanical properties are presented below in Table 4:

TABLE 4

| | Axial Stress @ Yield, psi (avg) | Radial Strain @ Yield, Microinch/ inch | Axial Strain @ Yield Microinch/ inch | Axial Strain to Radial Strain ratio | Area Under Axial Curve @ Yield | Area Under Radial Curve @Yield | Poisson's Ratio @ Yield | Young's Modulus @ Yield, psi e(+6) |
|---|---|---|---|---|---|---|---|---|
| Example 2 | 2115 | 1480 | 4760 | 3.22 | 6710 | 2550 | 0.31 | 0.44 |
| Example 3 | 2215 | 1635 | 5190 | 3.17 | 7750 | 2930 | 0.43 | 0.43 |

TABLE 4-continued

|  | Axial Stress @ Yield, psi (avg) | Radial Strain @ Yield, Microinch/ inch | Axial Strain @ Yield Microinch/ inch | Axial Strain to Radial Strain ratio | Area Under Axial Curve @ Yield | Area Under Radial Curve @Yield | Poisson's Ratio @ Yield | Young's Modulus @ Yield, psi e(+6) |
|---|---|---|---|---|---|---|---|---|
| Example 4 | 1580 | 1460 | 3960 | 2.71 | 4110 | 1810 | 0.37 | 0.40 |
| Comparative Example 1 | 1760 | 3555 | 4390 | 1.24 | 5250 | 4440 | 0.42 | 0.49 |

As shown in Table 4, the radial strain values at yield (i.e., the elastic limit) for the cements in Examples 2-4 are much lower than the radial strain at yield for the cement in Comparative Example 1 due to the compressible nature of the flexible hollow particles under pressure. Moreover, the axial strain to radial strain ratios of the cements in Examples 2-4 are higher than the axial strain to radial strain ratio of the cement in Comparative Example 1. Therefore, when axial pressure is imposed on the cement column in the well bore, the radial expansion is significantly less for the cements containing both flexible, compressible and non-flexible beads as compared to the cement containing only non-flexible beads because of the reduction in volume of the cements containing the elastic particles. A significant radial expansion under axial stress is expected for cements containing non-flexible beads such as those described in Comparative Example 1 or in cements where water is used to decrease the density. The Poisson's Ratio and Young's Modulus values at yield for the cements in Examples 2-4 tend to be lower than or comparable to those values at yield for the cement in Comparative Example 1, as shown in Table 3. The total area under a load vs. displacement curve reflects the ability of a material to absorb the imposed stress in the direction of displacement. Comparing the areas under the radial curves for the cement compositions in Examples 2-4 and the cement compositions in Comparative Example 1 indicates the unique advantage the addition of elastic particles provides to the cement composition. Due to their compressible nature, the particles absorb the axial stress without having to distribute the stress in a radial direction. As a result, the radial dissipation of imposed axial stress is significantly lower for the compositions in Examples 2-4 than for the compositions in Comparative Example 1. This result clearly indicates that during the life of the well, the imposed stresses will be primarily absorbed by the elastic particles without requiring changed dimensions to the cement columns.

EXAMPLE 5

EXPANCEL 53 WU particles were suspended in three times the volume of water compared to that of the particles, and the resulting slurry was charged into a cylindrical stainless steel can provided with a lid to which a stirring paddle was connected. The slurry filled ¼ the available volume in the can after the lid was fitted. The can was then inserted into a heated water bath of a HOWCO cement consistometer manufactured by Halliburton Energy Services. The motor in the consistometer was turned which rotated the metal can while holding the lid steady. After stirring the assembly in this manner for a period of time at a desired temperature, the can was disassembled, and the expanded solid therein was filtered and dried in open air at ambient temperature. This procedure was repeated at different heating temperatures and times to obtain expanded particles of different specific gravities. In particular, when EXPANCEL 53 WU particles of specific gravity 1.1 were heated at 170° F. for 4 hours, the specific gravity of the expanded particles was 0.345; whereas when the same material was heated to 200° F. for 4 hours, the specific gravity of the expanded particles was 0.1.

A cement slurry having a density of 11.3 pounds per gallon was prepared according to the API procedure mentioned previously by mixing class C cement with water (57% bwoc), SILICALITE fumed silica (15% bwoc), CFR-3 dispersant supplied by Halliburton Energy Services (2% bwoc), the EXPANCEL 53 WU particles of specific gravity 0.3 pre-expanded as described above (9.8% bwoc), the EXPANCEL 53 WU particles of specific gravity 0.1 pre-expanded as described above (2.6% bwoc), and a defoamer (2% bwoc). The slurry was poured into cylindrical plastic containers of dimensions 2"×4", closed with lids, and cured at room temperature for 24 hours until the cement slurry solidified. The plastic containers were transferred to a water bath kept at 180° F. for 18 hours, and the samples were submitted to cyclical load/displacement studies using the equipment described in Example 2. The cyclic load/displacement studies were performed by measuring the force to break an initial sample, followed by cycling the loads of subsequent samples between 20% and 90% of the load force to break the initial sample. When the load force reached the maximum or minimum value, a two second resting time was maintained before the beginning of the next cycle. The axial and radial displacements were measured as a function of load force. The initial compressive strengths were measured either under no confining pressure, or a confining pressure of 1000 psi. The results are shown in Table 5.

COMPARATIVE EXAMPLE 2

Cement samples were prepared as described in Example 5 except that the EXPANCEL 53 WU particles were replaced with SPHERELITE cenospheres (25% bwoc). The slurry density was 12.6 pounds per gallon. The samples were submitted for cyclic load/displacement analysis. The results are shown in Table 5.

TABLE 5

| Sample | Confining Pressure, psi | Compressive Strength, psi | # Cycles to Break |
|---|---|---|---|
| Comparative Example 2 | None | 6960 | 120 |
| Comparative Example 2 | 1000 | 8000 | 200 |
| Example 4 | None | 3250 | 120 |
| Example 4 | 1000 | 3300 | 240 |

The results in Table 5 show that the composition containing the flexible particles lasted longer under cyclic loading and unloading of pressure under confining conditions. The confining pressure is applied to simulate the confinement on a cement column from the formation or another casing Pipe.

COMPARATIVE EXAMPLE 3

A cement slurry having a density of 12.02 pounds per gallon was prepared using the API procedure mentioned in Example 2 by mixing class H cement with water (54% bwoc), unexpanded hollow polystyrene particles of EPS (expandable polystyrene) grade, ethoxylated (10 moles) nonylphenol (0.04 gallon per sack of cement), and a defoamer. The slurry was poured into cubic molds as described in Example 1 and cured in an autoclave at 155° F. for 24 hours under a pressure of 3,000 psi. The pressure was released, and the density of the slurry was measured to be 12.3 pounds per gallon. The measured density of the slurry after curing under pressure was similar to the original slurry density, suggesting that the polystyrene particles were essentially non-compressible.

EXAMPLE 6

EPS grade hollow polystyrene particles of specific gravity 1.01 were heated in water to 170° F. for 3 hours following the procedure described in Example 5. The expanded particles were filtered and dried. The specific gravity of the expanded particles was 0.1.

A cement slurry having a 12.08 pounds per gallon density was prepared as described in Comparative Example 3 except that the unexpanded hollow polystyrene particles were replaced with the pre-expanded polystyrene particles of specific gravity of 0.1. The slurry was cured under the same conditions as described in Comparative Example 3. The density measured after curing under pressure was 14.9 pounds per gallon, clearly indicating that pre-expansion of the particles made them flexible and compressible.

EXAMPLE 7

Figure 3:
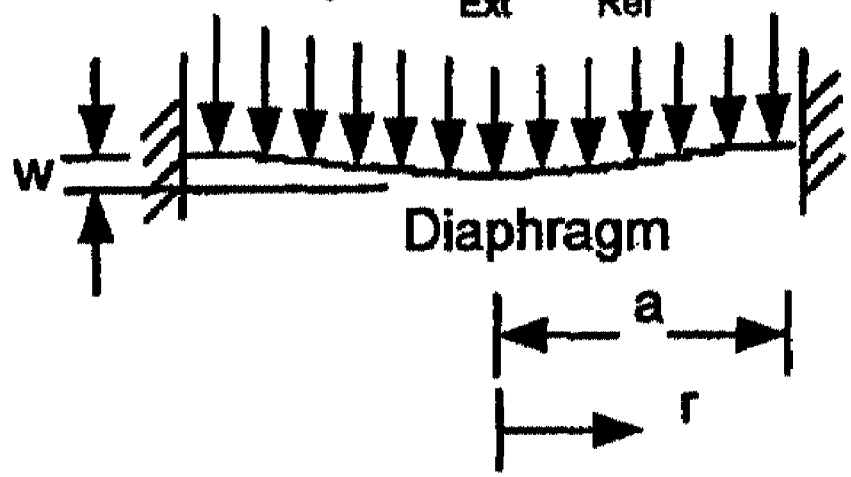
FIG. 3 illustrates a portion of a clamped circular plate with a uniformly distributed load, the simulated behavior of which may be used to model the behavior of certain exemplary embodiments of variable pressure weighting material particles of the present invention.

A numerical simulation was performed to model embodiments of a variable pressure weighting material particle of the present invention comprising elastomeric materials configured in the shape of a disk. Each of the two sides of the disk may behave like a pressure-loaded diaphragm. Thus, each side of the disk may be evaluated as a circular plate subjected to a uniformly distributed loading, as illustrated in FIG. 3. The deflection of such circular plate when subjected to such loading depends on factors such as the circular plate's material properties, geometric properties, as well as upon certain boundary conditions and the magnitude of the loading. A variety of formulae for particular plate and load configurations may be found in textbooks such as "Roark's Formulas for Stress and Strain" by Young and Roark, as well as "Formulas for Stress, Strain and Structural Matrices" by Pilkey.

The deflection of one side of the variable pressure weighting material particles that are the subject of this example will be modeled as that of a clamped circular plate with a uniformly distributed load, as depicted in FIG. 3, for which model the following equations are relevant:

$$D = [Eh^3]/[12*(1-v^2)] \quad \text{Equation 4}$$

$$w(r) = \frac{(P-p_0)a^4[1-(r/a)^2]^2}{64D} \quad \text{Equation 5}$$

-continued $$Volume_{reduced} \cong 2 \times \sum_{i=1}^{n} 2\pi(r_i)(r_i - r_{i-1})(w(r_i)) \quad \text{Equation 6}$$

$$VPWM_{mass} = [2(a+z)^2 h + ((a+z)^2 - (a)^2)T]S\pi \quad \text{Equation 7}$$

$$VPWM_{volume} \cong (a+z)^2(T+2h)\pi - Volume_{reduced} \quad \text{Equation 8}$$

$$VPWM_{density} \cong VPWM_{mass}/VPWM_{volume} \quad \text{Equation 9}$$

$$VPWM_{specificgravity} \cong \quad \text{Equation 10}$$
$$VPWM_{density}/Water_{density\,at\,reference\,temperature}$$

In the above equations, D is the bending rigidity of the plate, E is the Young's Modulus of the plate material, h is the wall thickness of the plate material, v is the Poisson's ratio of the plate material, w(r) is the deflection of the plate at a point r. P represents the external pressure acting upon the plate, and $p_0$ represents the internal pressure within the variable pressure weighting material particle. The distance from the center of the disk of a point anywhere along the surface of the side of the disk may be represented by r, where 0<r<a. The inner diameter of the plate is 2*a. The overlap of the diaphragm plates is z, the internal separation distance is T, and S represents the density of the material used to manufacture the variable pressure weighting material particle, as measured at atmospheric temperature and pressure. In all Examples 7-10, the overlap z is assumed to be 0.015 inches.

The specific gravity of a variable pressure weighting material may be found by employing Equation 4 to determine D, then using Equation 5 to determine w(r) at a given external pressure P and internal pressure $p_o$. The maximum value for w(r) is one half the separation distance of each side of the variable pressure weighting material which is T/2. Once w(r) has been determined for a given P and $p_o$, Equation 6 may then be used to determine the decrease in the internal volume for the variable pressure weighting material particle at the given P and $p_o$, by performing a summation of the reduction in the volume of the variable pressure weighting material particle at each incremental point along the variable pressure weighting material particle' radius. For Example 8, the internal volume decrease was used to determine the internal pressure increase by iterating the external pressure P and calculating a new internal pressure, then applying ideal gas laws. For Examples 79 and 10, the internal pressure of the particle $p_o$ was assumed to be 0, and was ignored.

Equation 7 may be used to calculate the mass of the variable pressure weighting material particle. Equation 5 may be used to calculate the volume of the variable pressure weighting material particle. The variable pressure weighting material density may then be found by dividing the variable pressure weighting material particle volume by its mass, as shown in Equation 9. The variable pressure weighting material particle specific gravity may then be calculated by dividing the variable pressure weighting material density by the density of water at a chosen reference temperature.

Sample Composition No. 1 represents a variable pressure weighting material particle formed from a VITON™ elastomer having an inner diameter of 0.1 inches, a diaphragm thickness of 0.02 inches, and a distance T of 0.02 inches.

Sample Composition No. 2 represents a variable pressure weighting material particle formed from a VITON™ elastomer having an inner diameter of 0.1 inches, a diaphragm thickness of 0.02 inches, and a distance T of 0.04 inches.

Sample Composition No. 3 represents a variable pressure weighting material particle formed from a VITON™ elastomer having an inner diameter of 0.2 inches, a diaphragm thickness of 0.02 inches, and a distance T of 0.04 inches.

The model ignored the internal fluid compression. The model assumed each exemplary variable pressure weighting material particle comprised two uniformly pressurized disks with rigidly supported edges separated by a fixed distance. The model further assumed that each side of the disk or diaphragm would only deform a distance equal to one half the separation distances, which reflects the fact that at maximum compression, the two sides would touch at a point in the middle of the disk. Additionally, the model assumed that each exemplary variable pressure weighting material particle had a Young's Modulus of $0.00049 \times 10^6$, a Poisson's Ratio of 0.4, and a specific gravity (S) at standard conditions of 0.98 (e.g., a density of 0.98 grams per cubic centimeter). The results of the numerical model are presented in Table 6 below.

TABLE 6

| Pressure (psi) | Specific Gravity | | |
|---|---|---|---|
| | Sample Composition No. 1 | Sample Composition No. 2 | Sample Composition No. 3 |
| 0 | 0.78 | 0.69 | 0.61 |
| 1,000 | 0.93 | 0.88 | 0.94 |
| 5,000 | 0.95 | 0.92 | 0.96 |
| 10,000 | 0.96 | 0.94 | 0.96 |
| 12,000 | 0.96 | 0.94 | 0.96 |

Figure 6:
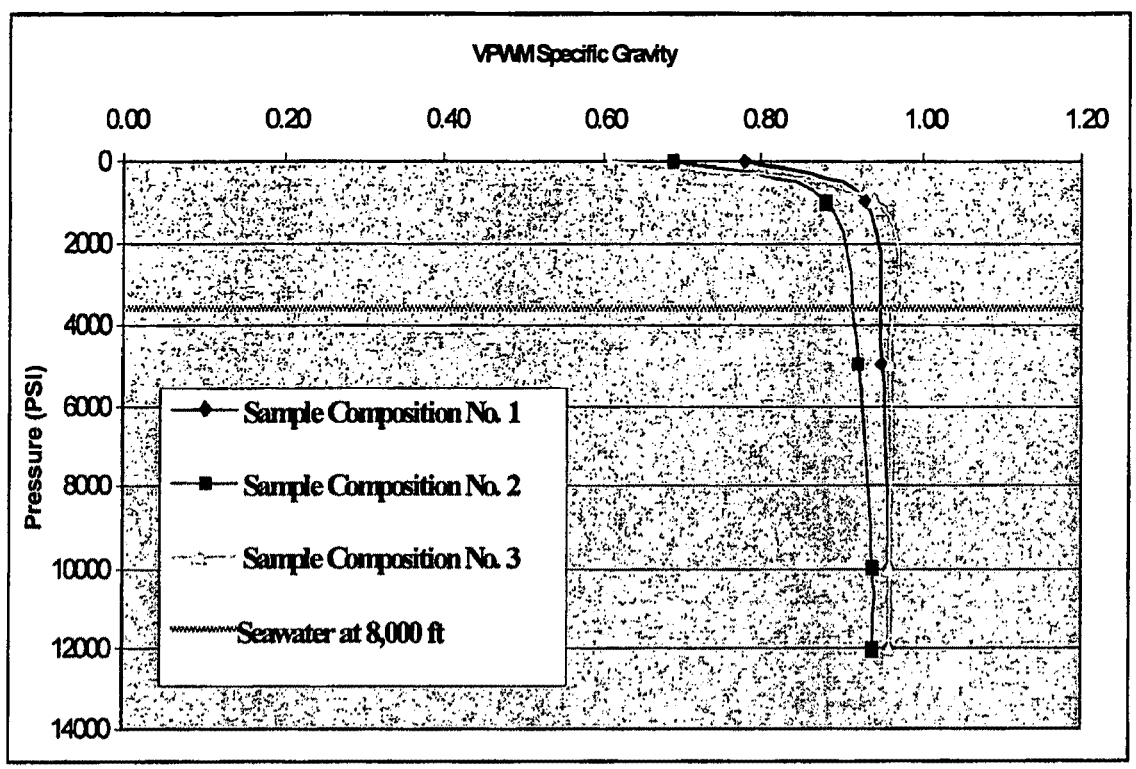
FIG. 6 is a graphical representation of exemplary pressure-density curves for certain exemplary embodiments of variable pressure weighting material particles comprising elastomers.

In this example, the specific gravities of the VITON™ elastomeric variable pressure weighting material particles ranged from about 0.60 to about 0.96, which represents about a 60% density change from their unpressurized state (e.g., their state at about sea level). The data in Table 6 is also depicted graphically in FIG. 6, which also provides the typical pressure that would be expected from an 8,000 foot column height of sea water, for comparison purposes.

EXAMPLE 8

A numerical simulation was performed to model embodiments of a variable pressure weighting material particle of the present invention comprising elastomeric materials configured in the shape of a disk.

Sample Composition No. 4 represents a variable pressure weighting material particle formed from a VITON™ elastomer having an inner diameter of 0.1 inches, a diaphragm thickness of 0.02 inches, and a distance T of 0.04 inches, and an internal pressure of 0 psi.

Sample Composition No. 5 represents a variable pressure weighting material particle formed from a VITON™ elastomer having an inner diameter of 0.1 inches, a diaphragm thickness of 0.02 inches, a distance T of 0.04 inches, and an internal pressure of 25 psi.

Sample Composition No. 6 represents a variable pressure weighting material particle formed from a VITON™ elastomer having an inner diameter of 0.1 inches, a diaphragm thickness of 0.02 inches, and a distance T of 0.04 inches, and an internal pressure of 100 psi.

Sample Composition No. 7 represents a variable pressure weighting material particle formed from a VITON™ elastomer having an inner diameter of 0.1 inches, a diaphragm thickness of 0.02 inches, and a distance T of 0.04 inches, and an internal pressure of 200 psi.

The model assumed each exemplary variable pressure weighting material particle comprised two uniformly pressurized disks with rigidly supported edges separated by a fixed distance. The model further assumed that each side of the disk or diaphragm would only deform a distance equal to one half the separation distances, which reflects the fact that at maximum compression, the two sides would touch at a point in the middle of the disk. Additionally, the model assumed that each exemplary variable pressure weighting material particle had a Young's Modulus of $0.00049 \times 10^6$, a Poisson's Ratio of 0.4, and a specific gravity (S) at standard conditions of 0.98 (e.g., a density of 0.98 grams per cubic centimeter). The results of the numerical model are presented in Table 7 below.

TABLE 7

| Pressure (psi) | Specific Gravity | | | |
|---|---|---|---|---|
| | Sample Composition No. 4 | Sample Composition No. 5 | Sample Composition No. 6 | Sample Composition No. 7 |
| 0 | 0.69 | 0.67 | 0.64 | 0.172 |
| 1,000 | 0.88 | 0.875 | 0.86 | 0.813 |
| 2,500 | 0.91 | 0.91 | 0.902 | 0.89 |
| 5,000 | 0.925 | 0.925 | 0.917 | 0.91 |
| 10,000 | 0.936 | 0.936 | 0.93 | 0.925 |
| 12,000 | 0.94 | 0.94 | 0.935 | 0.93 |

Figure 7:
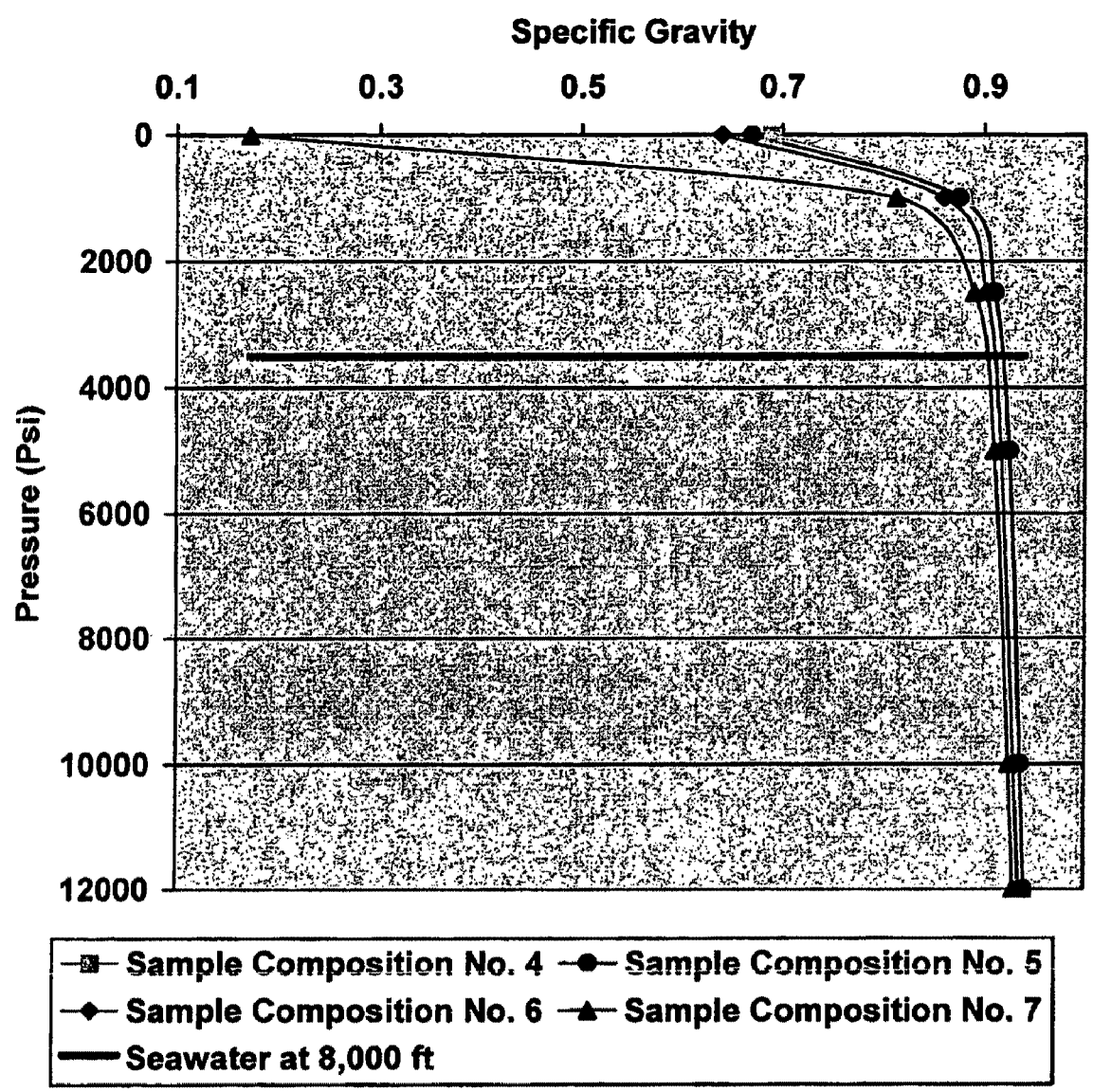
FIG. 7 is a graphical representation of exemplary pressure-density curves for certain other exemplary embodiments of variable pressure weighting material particles comprising elastomers.

In this example, the specific gravities of the VITON™ elastomeric variable pressure weighting material particles ranged from about 0.172 to about 0.94, which represents about a 546% density change from their unpressurized state (e.g., their state at about sea level). The data in Table 7 is also depicted graphically in FIG. 7, which also provides the typical pressure that would be expected from an 8,000 foot column height of sea water, for comparison purposes.

EXAMPLE 9

A numerical simulation was performed to model embodiments of a variable pressure weighting material particle of the present invention comprising polyethylene configured in the shape of a disk.

Sample Composition No. 8 represents a variable pressure weighting material particle formed from polyethylene having an inner diameter of 0.1 inches, a diaphragm thickness of 0.02 inches, and a distance T of 0.02 inches.

Sample Composition No. 9 represents a variable pressure weighting material particle formed from polyethylene having an inner diameter of 0.1 inches, a diaphragm thickness of 0.02 inches, and a distance T of 0.04 inches.

Sample Composition No. 10 represents a variable pressure weighting material particle formed from polyethylene having an inner diameter of 0.2 inches, a diaphragm thickness of 0.02 inches, and a distance T of 0.04 inches.

Sample Composition No. 11 represents a variable pressure weighting material particle formed from polyethylene having an inner diameter of 0.4 inches, a diaphragm thickness of 0.02 inches, and a distance T of 0.04 inches.

Sample Composition No. 12 represents a variable pressure weighting material particle formed from polyethylene having an inner diameter of 0.5 inches, a diaphragm thickness of 0.02 inches, and a distance T of 0.04 inches.

The model ignored the internal fluid compression. The model assumed each exemplary variable pressure weighting material particle comprised two uniformly pressurized disks with rigidly supported edges separated by a fixed distance. The model further assumed that each side of the disk or diaphragm would only deform a distance equal to one half the separation distances. Additionally, the model assumed that each exemplary variable pressure weighting material particle had a Young's Modulus of $0.1 \times 10^6$, a Poisson's Ratio of 0.4, and a specific gravity (S) at standard conditions of 0.93 (e.g., a density of 0.93 grams per cubic centimeter). The results of the numerical model are presented in Table 8 below.

TABLE 8

| | Specific Gravity | | | | |
|---|---|---|---|---|---|
| Pressure (psi) | Sample Composition No. 8 | Sample Composition No. 9 | Sample Composition No. 10 | Sample Composition No. 11 | Sample Composition No. 12 |
| 0 | 0.75 | 0.66 | 0.58 | 0.53 | 0.51 |
| 1,000 | 0.76 | 0.66 | 0.64 | 0.81 | 0.84 |
| 5,000 | 0.78 | 0.68 | 0.77 | 0.87 | 0.89 |
| 10,000 | 0.8 | 0.69 | 0.81 | 0.89 | 0.9 |
| 12,000 | 0.81 | 0.7 | 0.82 | 0.89 | 0.91 |

Figure 8:
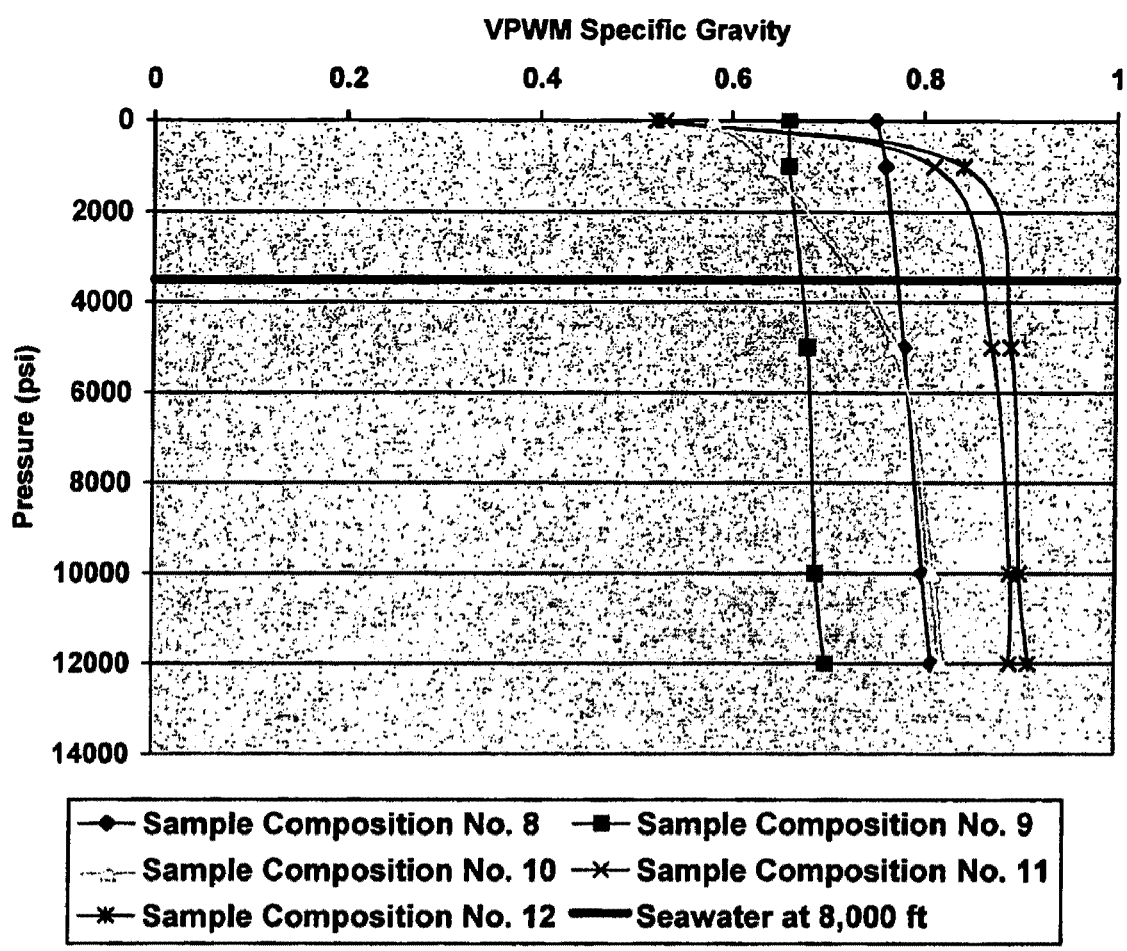
FIG. 8 is a graphical representation of exemplary pressure-density curves for certain exemplary embodiments of variable pressure weighting material particles comprising polyethylene.

In this example, the specific gravities of the polyethylene variable pressure weighting material particles ranged from about 0.52 to about 0.91, which represents about a 75% density change from their unpressurized state (e.g., their state at about sea level). The data in Table 8 is also depicted graphically in FIG. 8, which also provides the typical pressure that would be expected from an 8,000 foot column height of sea water, for comparison purposes.

EXAMPLE 10

A numerical simulation was performed to model embodiments of a variable pressure weighting material particle of the present invention comprising beryllium copper configured in the shape of a disk.

Sample Composition No. 13 represents a variable pressure weighting material particle formed from beryllium copper having an inner diameter of 0.1 inches, a diaphragm thickness of 0.01 inches, and a distance T of 0.02 inches.

Sample Composition No. 14 represents a variable pressure weighting material particle formed from beryllium copper having an inner diameter of 0.1 inches, a diaphragm thickness of 0.01 inches, and a distance T of 0.04 inches.

Sample Composition No. 15 represents a variable pressure weighting material particle formed from beryllium copper having an inner diameter of 0.2 inches, a diaphragm thickness of 0.01 inches, and a distance T of 0.04 inches.

Sample Composition No. 16 represents a variable pressure weighting material particle formed from beryllium copper having an inner diameter of 0.4 inches, a diaphragm thickness of 0.01 inches, and a distance T of 0.04 inches.

Sample Composition No. 17 represents a variable pressure weighting material particle formed from beryllium copper having an inner diameter of 0.5 inches, a diaphragm thickness of 0.01 inches, and a distance T of 0.04 inches.

Sample Composition No. 18 represents a variable pressure weighting material particle formed from beryllium copper having an inner diameter of 0.5 inches, a diaphragm thickness of 0.02 inches, and a distance T of 0.04 inches.

The model ignored the internal fluid compression. The model assumed each exemplary variable pressure weighting material particle comprised two uniformly pressurized disks with rigidly supported edges separated by a fixed distance. The model further assumed that each side of the disk or diaphragm would only deform a distance equal to one half the separation distances. Additionally, the model assumed that each exemplary variable pressure weighting material particle had a Young's Modulus of $30 \times 10^6$, a Poisson's Ratio of 0.3, and a specific gravity (S) at standard conditions of 7.7 (e.g., a density of 7.7 grams per cubic centimeter). The results of the numerical model are presented in Table 9 below.

TABLE 9

| | Specific Gravity | | | | | |
|---|---|---|---|---|---|---|
| Pressure (psi) | Sample Composition No. 13 | Sample Composition No. 14 | Sample Composition No. 15 | Sample Composition No. 16 | Sample Composition No. 17 | Sample Composition No. 18 |
| 0 | 5.42 | 4.66 | 3.8 | 3.26 | 3.13 | 4.27 |
| 1,000 | 5.56 | 4.75 | 5.22 | 5.11 | 4.15 | 4.46 |
| 5,000 | 6.02 | 4.99 | 6.17 | 5.41 | 4.61 | 5.07 |
| 10,000 | 6.51 | 5.55 | 6.62 | 5.48 | 4.73 | 5.31 |
| 12,000 | 6.59 | 5.67 | 6.69 | 5.5 | 4.76 | 5.36 |

Figure 9:
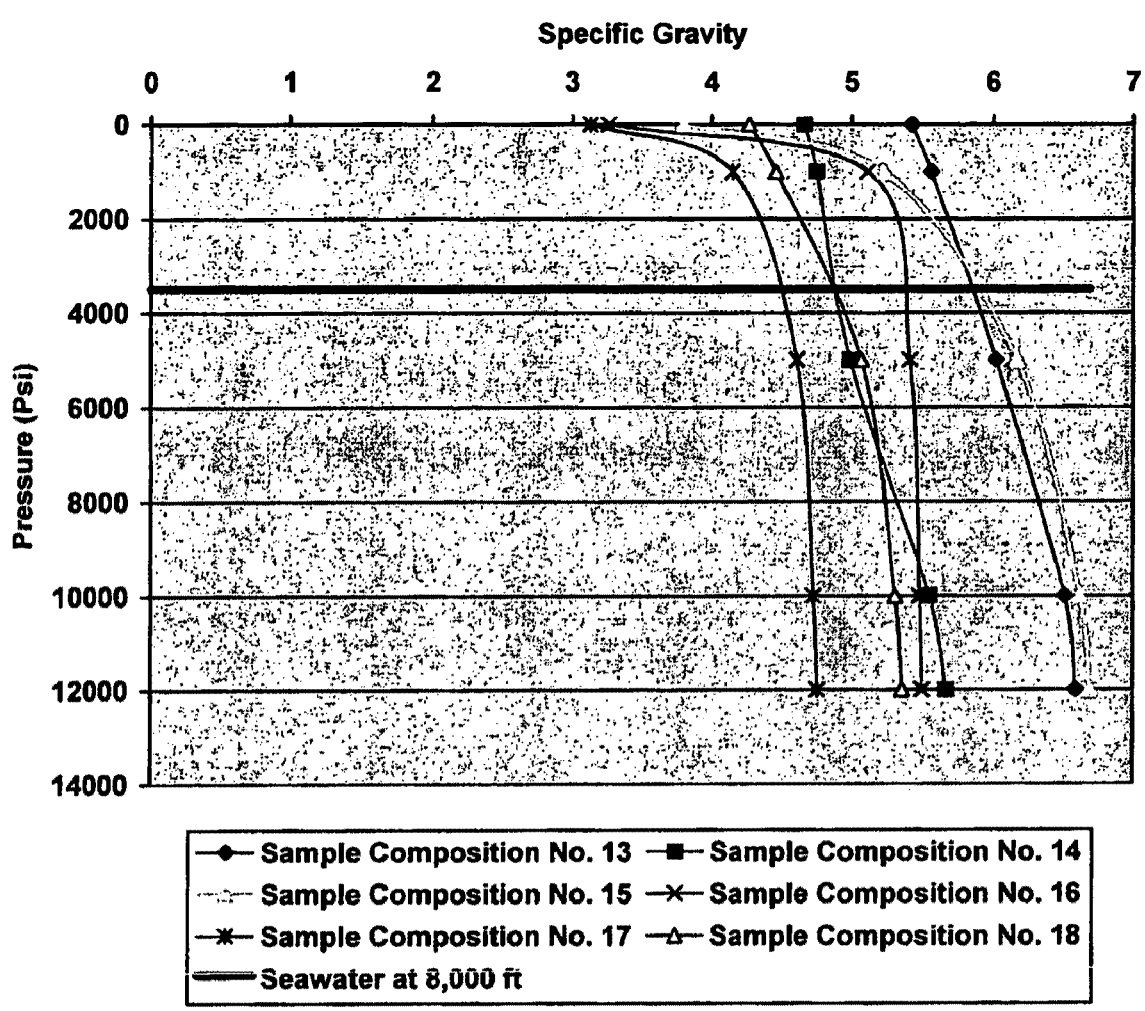
FIG. 9 is a graphical representation of exemplary pressure-density curves for certain exemplary embodiments of variable pressure weighting material particles comprising metal.

In this example, the specific gravities of the beryllium copper variable pressure weighting material particles ranged from about 3.13 to about 6.69, which represents about a 113% density change from their unpressurized state (e.g., their state at about sea level). The data in Table 9 is also depicted graphically in FIG. 9, which also provides the typical pressure that would be expected from an 8,000 foot column height of sea water, for comparison purposes.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A variable density drilling fluid comprising:
   a base fluid having a density at sea level in the range of from about 4 lb/gallon to about 18 lb/gallon and comprising a shale swelling inhibitor, an emulsifier, a viscosifier, caustic, or a fixed-density weighting agent; and
   a portion of variable pressure weighting material particles comprising an internal fluid at a pressure of 15 psi to about 100 psi that compress during introduction into and expand during retrieval from a subterranean formation.

2. The drilling fluid of claim 1 wherein a portion of the variable pressure weighting material particles further comprises a compressible fluid that comprises air, propane, ammonia, fluorinated hydrocarbon refrigerants, nitrogen, carbon dioxide, argon, or mixtures thereof.

3. The drilling fluid of claim 1 wherein the portion of variable pressure weighting material particles is present in the treatment fluid in an amount in the range of from about 0.01% to about 40% by volume of the treatment fluid.

4. The drilling fluid of claim 1 wherein a portion of the variable pressure weighting material particles have a specific gravity in the range of from about 0.1 to about 1.08.

5. The drilling fluid of claim 1 wherein a portion of the variable pressure weighting material particles can withstand a pressure up to about 21,000 psi without crushing.

6. The drilling fluid of claim 5 wherein a portion of the variable pressure weighting material particles can rebound to about their original size and shape when the pressure is removed.

7. The drilling fluid of claim 1 wherein a portion of the variable pressure weighting material particles can withstand temperatures up to about 650° F.

8. The drilling fluid of claim 1 wherein the density of the drilling fluid increases as the pressure in a subterranean bore hole increases.

9. The drilling fluid of claim 8 wherein the density of the drilling fluid in the bore hole is in the range of from about 0.01% to about 25% higher than its density at sea level.

10. The drilling fluid of claim 8 wherein the bore hole is located beneath the ocean floor.

11. The drilling fluid of claim 10 wherein the density of the drilling fluid decreases as the drilling fluid travels from the bore hole up to sea level.

12. The drilling fluid of claim 1 wherein the variable pressure weighting material particle comprises a material selected from the group consisting of: a plastic, an elastomer, a metal, and a memory metal.

13. The drilling fluid of claim 8 having a density sufficient to prevent kicks without fracturing a region of the subterranean formation adjacent to the borehole.

14. The variable density treatment fluid of claim 1 wherein at least one of the variable pressure weighting material particles is in the shape of a disk or a tube.

15. The variable density treatment fluid of claim 1 wherein at least one of the variable pressure weighting material particles is in the shape of a tube and has a length to diameter ratio of about 1:1 to about 2:1.

16. The variable density treatment fluid of claim 1 wherein at least one of the variable pressure weighting material particles is in the shape of a disk.

17. The variable density treatment fluid of claim 16 wherein at least one side of the disk includes a dimple.

* * * * *